US010694066B2

(12) United States Patent
Watanabe et al.

(10) Patent No.: US 10,694,066 B2
(45) Date of Patent: Jun. 23, 2020

(54) ELECTRONIC WHITEBOARD, PROGRAM, AND INFORMATION PROCESSING METHOD

(71) Applicants: Ayako Watanabe, Kanagawa (JP); Yoshiko Aono, Kanagawa (JP); Yasuhiro Kuba, Kanagawa (JP); Eiji Kemmochi, Tokyo (JP)

(72) Inventors: Ayako Watanabe, Kanagawa (JP); Yoshiko Aono, Kanagawa (JP); Yasuhiro Kuba, Kanagawa (JP); Eiji Kemmochi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 24 days.

(21) Appl. No.: 15/950,362

(22) Filed: Apr. 11, 2018

(65) Prior Publication Data
US 2018/0234579 A1 Aug. 16, 2018

Related U.S. Application Data
(63) Continuation of application No. PCT/JP2016/077785, filed on Sep. 21, 2016.

(30) Foreign Application Priority Data
Oct. 15, 2015 (JP) .................................. 2015-203842

(51) Int. Cl.
H04N 1/21 (2006.01)
H04N 1/00 (2006.01)
(Continued)

(52) U.S. Cl.
CPC .................. H04N 1/21 (2013.01); B43L 1/00 (2013.01); B43L 1/04 (2013.01); G06F 11/1441 (2013.01); H04N 1/00 (2013.01)

(58) Field of Classification Search
CPC ....... G06F 9/461; G06F 11/1402; H04N 1/00; H04N 1/21; B43L 1/00; B43L 1/04
See application file for complete search history.

(56) References Cited

U.S. PATENT DOCUMENTS

2008/0250061 A1* 10/2008 Kim ........................ G11B 27/11
2012/0050197 A1* 3/2012 Kemmochi ......... G06F 21/6209
345/173
(Continued)

FOREIGN PATENT DOCUMENTS

EP 2919121 9/2015
JP 2005-088204 4/2005
(Continued)

OTHER PUBLICATIONS

International Search Report dated Nov. 15, 2016 in PCT/JP2016/077785 filed on Sep. 21, 2016.
(Continued)

Primary Examiner — Towfiq Elahi
(74) Attorney, Agent, or Firm — IPUSA, PLLC

(57) ABSTRACT

An electronic whiteboard includes a power button, a display device, and circuitry that implements processes of detecting an operation of the power button being turned off, storing at least a part of visible information displayed on the display device from a time the power button was turned on until a time the power button was turned off in a first storage device upon detecting that the power button has been turned off, determining whether to display the visible information stored in the first storage device on the display device based on a first time corresponding to a power-on time recorded when the power button was turned on and a second time corresponding to the power-off time recorded immediately before the first time when the power button was turned off, and controlling the display device to display the stored
(Continued)

visible information upon determining to display the stored visible information.

9 Claims, 27 Drawing Sheets

(51) Int. Cl.
*B43L 1/04* (2006.01)
*G06F 11/14* (2006.01)
*B43L 1/00* (2006.01)

(56) References Cited

U.S. PATENT DOCUMENTS

| | | | |
|---|---|---|---|
| 2015/0077369 A1 | 3/2015 | Nagahara et al. | |
| 2016/0103477 A1* | 4/2016 | Park | G06F 1/3265 |
| | | | 713/323 |

FOREIGN PATENT DOCUMENTS

| | | |
|---|---|---|
| JP | 2007-086230 | 4/2007 |
| JP | 2009-066936 | 4/2009 |
| JP | 2012-048610 | 3/2012 |
| JP | 5644266 | 12/2014 |
| JP | 2015-002514 | 1/2015 |
| JP | 2015-084211 | 4/2015 |

OTHER PUBLICATIONS

Extended European Search Report for 16855237.0 dated Sep. 7, 2018.

* cited by examiner

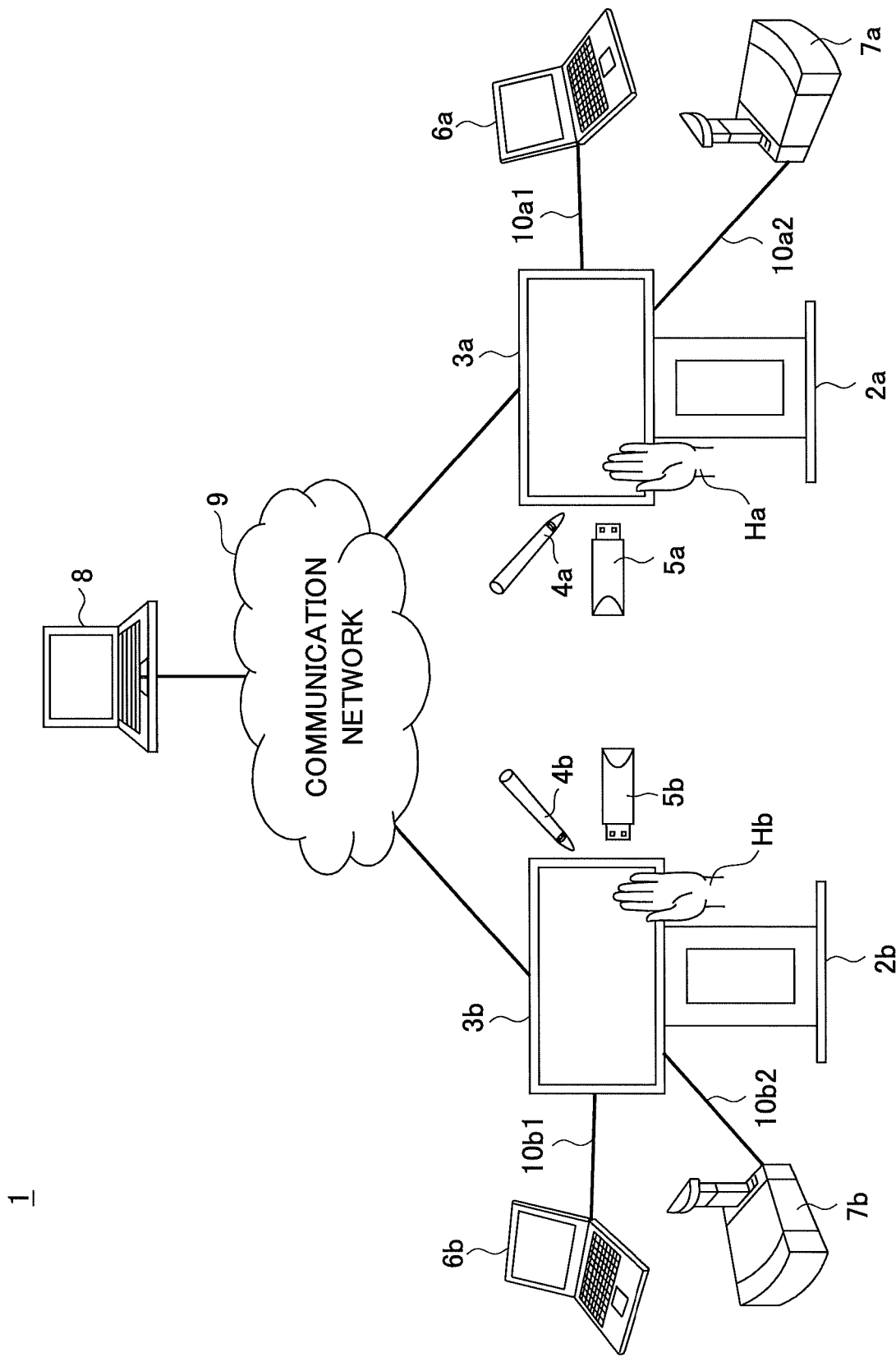

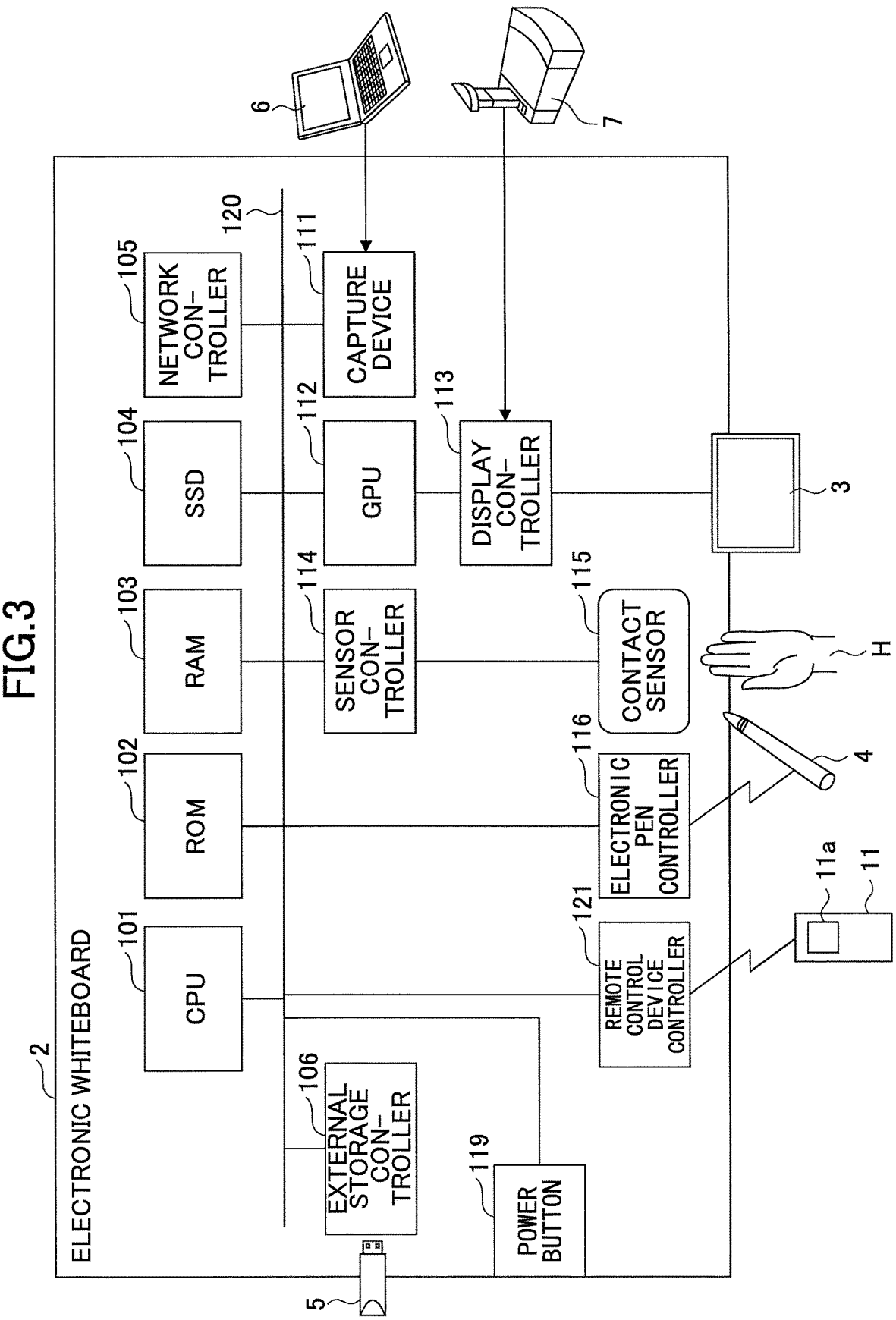

FIG.7
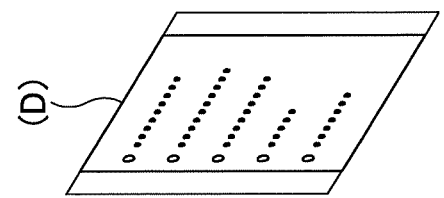
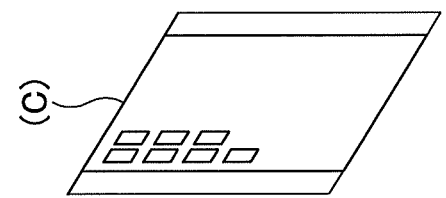
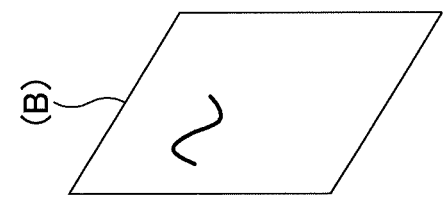
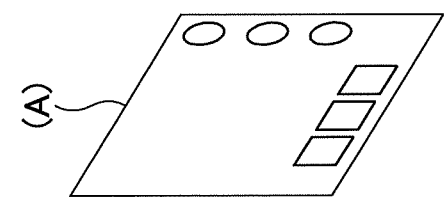
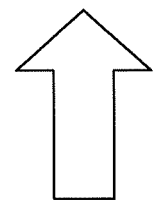
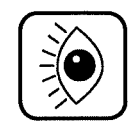

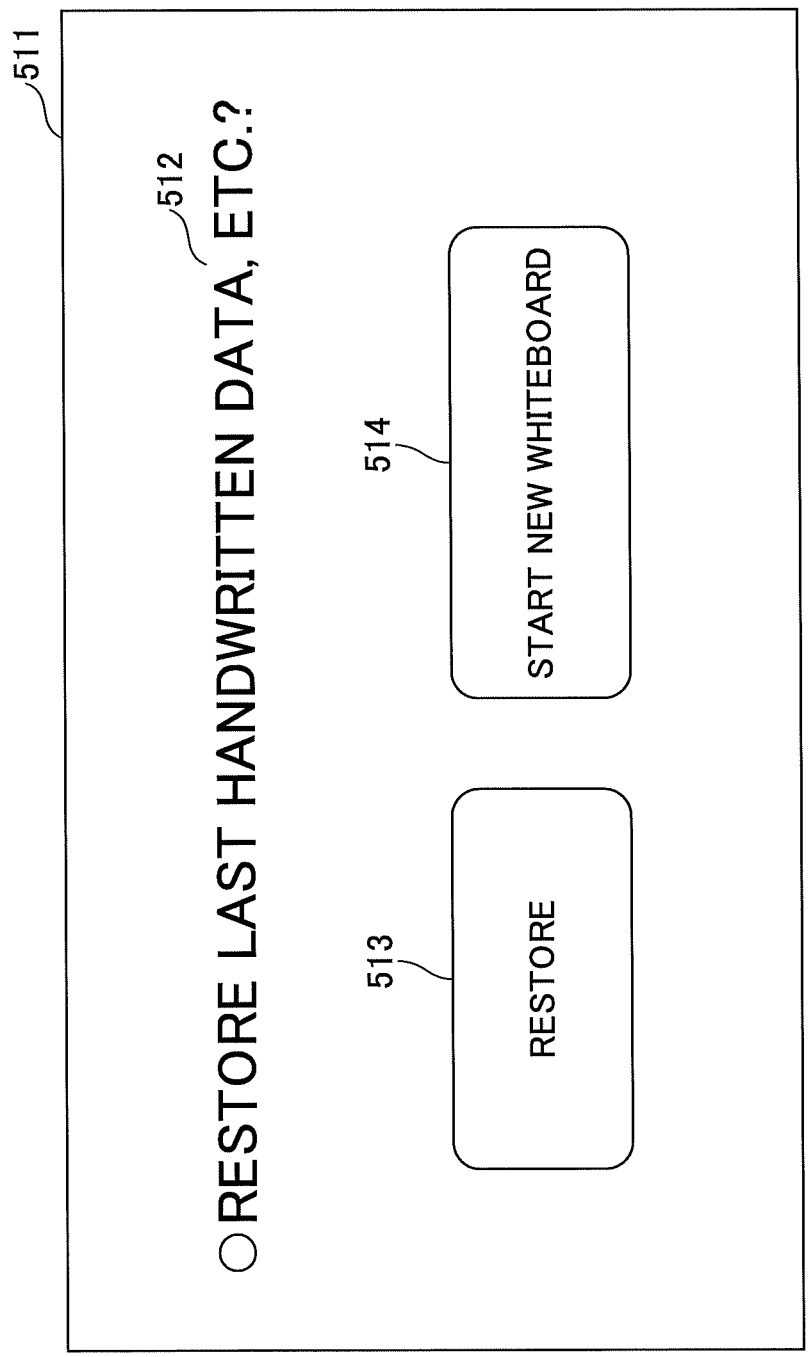

FIG.15

SYSTEM SETTINGS — 601

SYSTEM SETTINGS CHANGE

SETTINGS WILL BE REFLECTED UPON PRESSING [OK] AFTER CHANGING THE SETTING VALUES.

WHITEBOARD LOCATION NAME   NOT SET [ CHANGE ] — 602

- ☐ UPDATE SYSTEM THROUGH NETWORK UPON ACTIVATION
  - ☐ CHECK SYSTEM UPDATE UPON WHITEBOARD ACTIVATION

[ CHECK LATEST VERSION ] — 603

AUTOMATIC SHUTDOWN TIME          [ 5 HOURS ▼ ] — 604
SETTING WILL BE REFLECTED AFTER BEING RESTARTED.

AUTOMATIC RESTART TIME           [ 4:00 ▼ ] — 605

AUTOMATIC STANDBY TIME           [ 1 HOUR ▼ ] — 606

IMAGE QUALITY FOR REMOTE WHITEBOARD    [ HIGH IMAGE QUALITY ▼ ] — 607

TEMPORARY STORAGE SETTINGS
- ☐ USE TEMPORARY STORAGE FUNCTION    STORAGE PERIOD [ 10 MINUTES ]
- ☐ CHECK WHETHER TO READ TEMPORARILY SAVED FILE UPON STARTING WHITEBOARD

— 608

☐ DARKEN GRID/GUIDE LINES — 609

WHITEBOARD DETAILED SETTING DEFAULT VALUES
- ☐ AUTOMATICALLY SWITCH TO EXTERNAL INPUT WHEN EXTERNAL INPUT DISPLAY SCREEN CHANGES
- ☐ DO NOT DISPLAY PEN INPUT OPERATION GUIDANCE WHILE DISPLAYING EXTERNAL INPUT
- ☐ AUTOMATICALLY RECOGNIZE CLICK WHILE INPUTTING HANDWRITING TO REMOTE PC VIDEO
- ☐ FORMALIZE SHAPES ONLY IN FORMALIZE INPUT MODE (DO NOT FORMALIZE CHARACTERS)
- ☐ AUTOMATICALLY ADJUST POSITIONS OF CHARACTERS AND SHAPES

— 620

612b

☐ RESTORE WHITEBOARD FROM LAST SHUTDOWN UPON ACTIVATION — 612a

RESTORATION TIMEOUT TIME   [ 2 MINUTES ▼ ] — 612c

* DATA WILL NOT BE RESTORED UPON ACTIVATION IF THE TIME ELAPSED FROM LAST SHUTDOWN EXCEEDS THE ABOVE TIME PERIOD.

— 612

[ OK ] — 613    [ CANCEL ] — 614

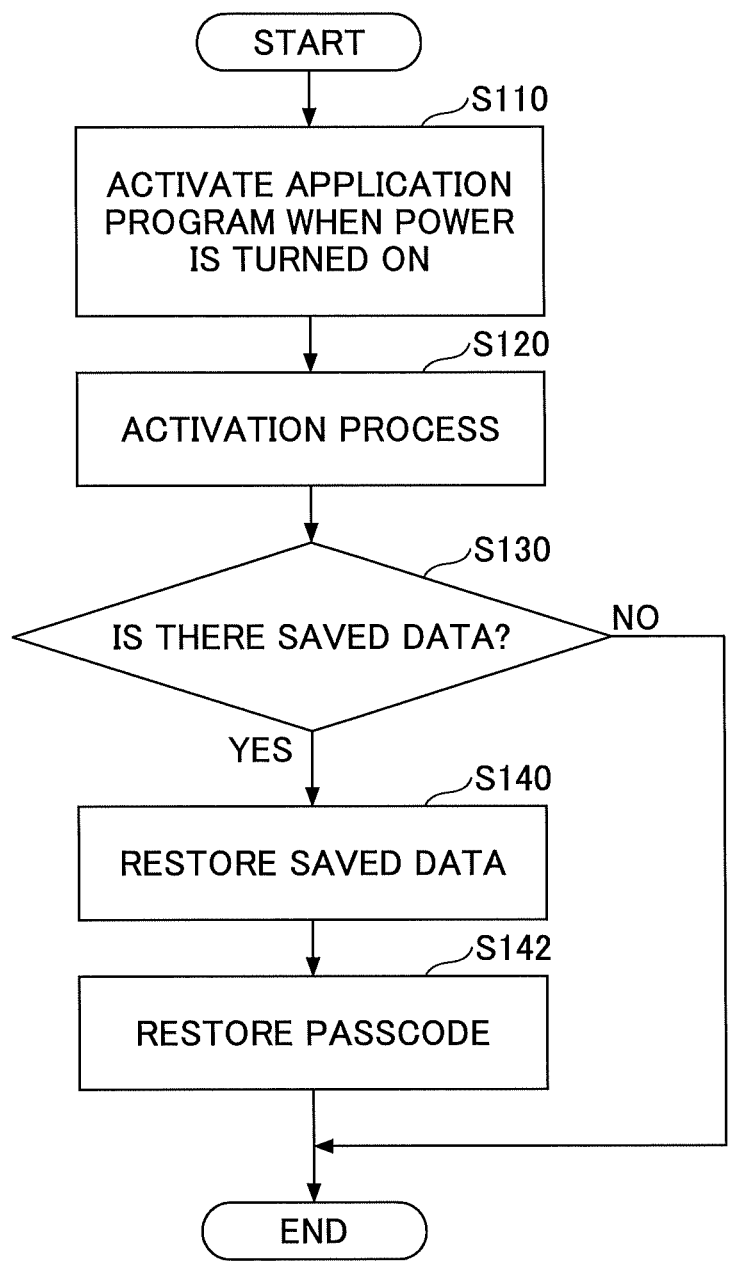

FIG. 21

Table 2

| STROKE DATA ID | START TIME | END TIME | COLOR | WIDTH | COORDINATE ARRAY DATA ID |
|---|---|---|---|---|---|
| s001 | 20130610102502 | 20130610102505 | ff0000 | 2 | c001 |
| s002 | 20130610102612 | 20130610102615 | 000ff0 | 3 | c002 |
| s003 | 20130610102704 | 20130610102712 | 0 | 1 | c003 |
| ... | ... | ... | ... | ... | ... | st001 / st002 / st003

FIG. 22

Table 3

| X COORDINATE VALUE | Y COORDINATE VALUE | TIME DIFFERENCE | PEN PRESSURE | c001 |
|---|---|---|---|---|
| 10 | 10 | 100 | 255 | |
| 12 | 10 | 200 | 255 | |
| 14 | 12 | 300 | 255 | |
| ... | ... | ... | ... | | c002 c003

...

ELECTRONIC WHITEBOARD, PROGRAM, AND INFORMATION PROCESSING METHOD

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2016/077785 filed on Sep. 21, 2016 and designating the U.S., which claims priority to Japanese Patent Application No. 2015-203842 filed on Oct. 15, 2015. The entire contents of the foregoing applications are incorporated herein by reference.

BACKGROUND OF THE INVENTION

1. Field of the Invention

The present invention relates to an electronic whiteboard, a program, and an information processing method.

2. Description of the Related Art

Electronic whiteboards are known that have touch panels embedded in large flat panel displays. Such electronic whiteboards are configured to display a screen that serves as a whiteboard, detect the trajectory of an electronic pen or a finger via the touch panel, and draw corresponding images on the screen as handwritten content. In this way, a user can use the screen as a whiteboard. Also, an electronic whiteboard that can be connected to a personal computer may be able to display the same screen as that displayed on the personal computer and draw the handwritten content over the personal computer screen, or enable operation of the personal computer based on information input via the touch panel of the electronic whiteboard, for example.

Further, such an electronic whiteboard has the function of storing handwritten data and the personal computer screen. Thus, by performing a predetermined operation at the end of a conference, for example, the user may be able to redisplay the handwritten data or the personal computer screen at a later time (see, e.g., Japanese Patent No. 5644266). Japanese Patent No. 5644266 discloses an electronic whiteboard system that stores handwritten data in association with a passcode.

An electronic whiteboard has a power button, and the electronic whiteboard is activated when the power button is turned on. Also, the electronic whiteboard stops operating when the power button is turned off. In order to save display information such as handwritten content data as described above, the user has to perform some operation to save the display information. However, there may be cases where the user presses the power button before saving the display information. For example, in a case where another button is arranged alongside the power button, the user may accidentally press the power button intending to press the other button. Also, the user may forget to save the display information and press the power button. Further, in a case where the electronic whiteboard can be turned on/off using a remote control device, the user may erroneously operate the remote control device and turn off the power of the electronic whiteboard, for example.

As described above, unintended loss of display information as a result of the user turning off the power button before saving the display information has been a problem.

SUMMARY OF THE INVENTION

An aspect of the present invention is directed to providing an electronic whiteboard that is capable of preventing data loss of display information even when a power button is turned off.

According to one embodiment of the present invention, an electronic whiteboard is provided that is activated in response to a power button being turned on and stops operating in response to the power button being turned off. The electronic whiteboard includes a display device configured to display visible information; a first storage device configured to store the visible information displayed on the display device; and circuitry configured to implement processes of controlling the display device to display the visible information, detecting an operation of the power button being turned off, recording a power-on time and a power-off time of the power button, storing at least a part of the visible information that was displayed on the display device from a time the power button was turned on until a time the power button was turned off in the first storage device upon detecting the operation of the power button being turned off, determining whether to display the visible information stored in the first storage device on the display device based on a first time corresponding to the power-on time recorded when the electronic whiteboard has been activated in response to the power button being turned on and a second time corresponding to the power-off time recorded immediately before the first time when the electronic whiteboard has stopped operating in response to the power button being turned off, and controlling the display device to display the visible information stored in the first storage device upon determining to display the visible information on the display device.

BRIEF DESCRIPTION OF THE DRAWINGS

FIG. 2 is a diagram illustrating an example overall configuration of an image processing system;

FIG. 3 is a diagram illustrating an example hardware configuration the electronic whiteboard;

FIG. 7 is a diagram illustrating an example configuration of image layers;

FIG. 12B is a flowchart illustrating a first example process performed by the electronic whiteboard when the power button of the electronic whiteboard or the remote power button is turned on;

FIG. 13 is a flowchart illustrating a second example process performed by the electronic whiteboard when the power button of the electronic whiteboard or the remote power button is turned on;

FIG. 14 is a diagram illustrating an example of a confirmation dialog displayed on a display;

FIG. 15 is a diagram illustrating an example of a setting screen displayed on the display;

FIG. 16B is a flowchart illustrating a third example process performed by the electronic whiteboard when the power button of the electronic whiteboard or the remote power button is turned on;

FIG. 17B is a flowchart illustrating a fourth example process performed by the electronic whiteboard when the power button of the electronic whiteboard or the remote power button is turned on;

FIG. 18B is a flowchart illustrating a fifth example process performed by the electronic whiteboard when the power button of the electronic whiteboard or the remote power button is turned on;

FIG. 20 is a flowchart illustrating a sixth example process performed by the electronic whiteboard when the power button of the electronic whiteboard or the remote power button is turned on;

FIG. 21 is a table illustrating a conceptual representation of the stroke array data; and FIG. 22 is a table illustrating a conceptual representation of the coordinate array data.

DESCRIPTION OF THE EMBODIMENTS

In the following, embodiments of the present invention are described with reference to the accompanying drawings.

<Operation Overview>

Figure 1A:
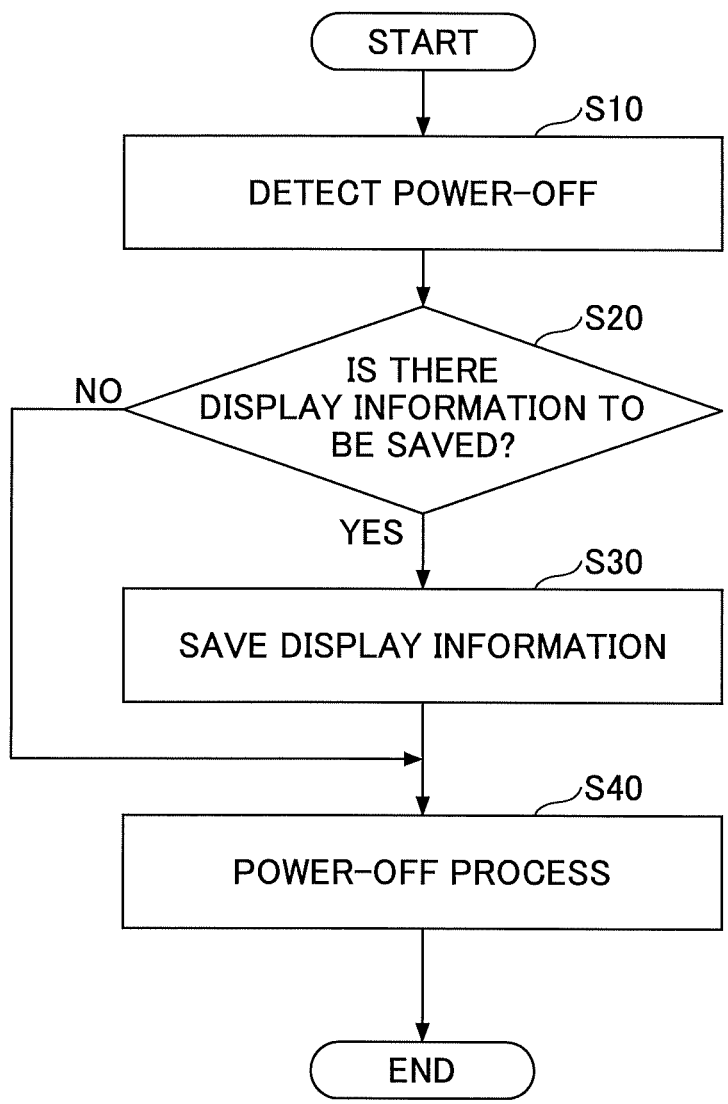
FIG. 1A is a diagram schematically illustrating an example operation of an electronic whiteboard according to an embodiment of the present invention.
Figure 1B:
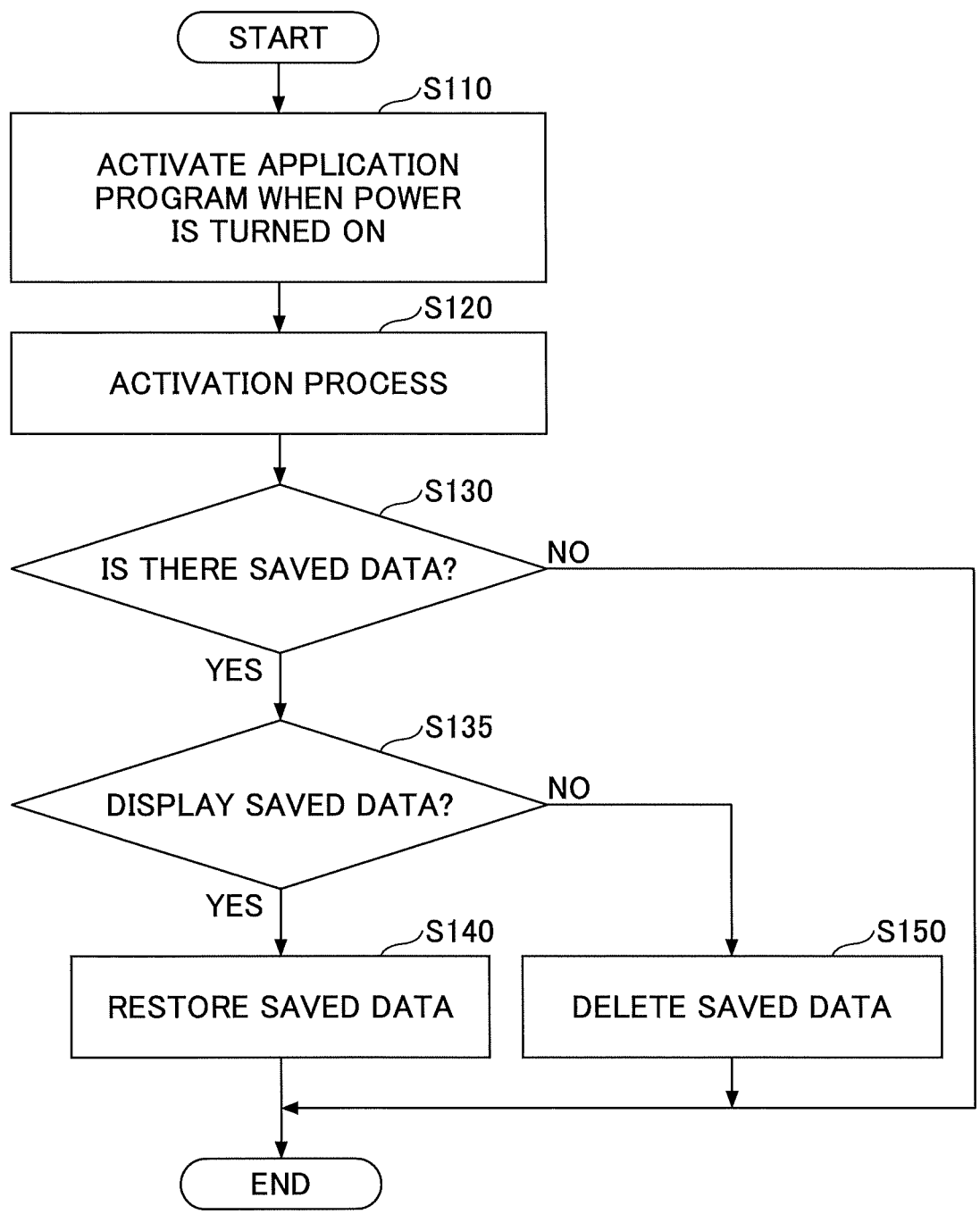
FIG. 1B is a diagram schematically illustrating another example operation of the electronic whiteboard according to an embodiment of the present invention.

FIGS. 1A and 1B are flowcharts schematically illustrating example operations of an electronic whiteboard according to an embodiment of the present invention. FIG. 1A illustrates operations of the electronic whiteboard when its power is turned off, and FIG. 1B illustrates operations of the electronic whiteboard when its power is turned on. Note that the process steps of the operations will be described in detail below.

When a user turns off a power button of the electronic whiteboard, the electronic whiteboard detects the operation as a power-off operation (step S10).

Upon detecting the power-off operation, the electronic whiteboard determines whether there is display information to be stored (step S20). The display information may be information representing a stroke corresponding to a handwritten line, for example.

If a positive determination (YES) is made in step S20, the electronic whiteboard saves the display information (step S30). The saved display information is referred to as "saved data".

Then, the electronic whiteboard performs a power-off process (step S40). In this way, even if the user erroneously turns off the power button of the electronic whiteboard, the electronic whiteboard can save the display information that was displayed.

When the user subsequently turns on the power button of the electronic whiteboard, an application program of the electronic whiteboard is activated (step S110).

When the application of the electronic whiteboard is activated, the electronic whiteboard performs an activation process (step S120).

The activated electronic whiteboard determines whether there is saved data (step S130).

If a positive determination (YES) is made in step S130, the electronic whiteboard determines whether to display the saved data (step S135). Whether to display the saved data can be determined in view of whether it can be presumed that the immediately preceding power-off operation of the power button was an erroneous operation, or whether it can be presumed that the power-off operation and the power-on operation of the power button were performed by the same person, for example. Specifically, it can be determined whether the period of time from power-off to power-on is less than a predetermined threshold value, or whether the power-off time and the power-on time are included within a preset conference reservation time period, for example. That is, whether an operation of the power button was presumably an erroneous operation can be determined by referring to the operation history of the power button, for example.

If a negative determination (NO) is made in step S135, the electronic whiteboard deletes the saved data (step S150). Thus, participants of another conference may be prevented from viewing the display information, for example.

If a positive determination (YES) is made in step S135, the electronic whiteboard restores and redisplays the saved data on a display or the like (step S140). Thus, when it can be presumed that the immediately preceding power-off operation of the power button was an erroneous operation, or when it can be presumed that the power-off operation and the power-on operation of the power button were performed by the same person, the display information can be restored and redisplayed.

Thus, even if the user erroneously turns off the electronic whiteboard without saving the display information, the electronic whiteboard according to the present embodiment can prevent loss of the display information and can redisplay the display information.

Terminology

Display information refers to visible information that was displayed on a display of the electronic whiteboard at some time point between a power-on time and a power-off time of the electronic whiteboard. That is, the display information is not limited to visible information representing a screen (page) that was displayed on the display but may also include visible information saved as a page, for example. Note that not all of the display information has to be stored when the power is turned off, and in some embodiments, only a part of the display information, such as only a page displayed on the display may be stored, for example. The visible information includes at least one of a stroke image and an output image (e.g., images (B) and (C) of FIG. 7), which will be described below. The visible information may further include a user interface image (e.g., image (A) of FIG. 7), for example.

Also, the process of saving display information when the power button is turned off and the process of restoring the saved data as illustrated in FIGS. 1A and 1B are referred to as "power button related processes".

Erroneous operation of the power button refers to turning off the power button without saving display information that should have been saved. Erroneous operations may include unintentionally pressing the power button and turning off the power button as well as intentionally pressing the power button and turning off the power button.

A determination of whether a power-off operation and a power-on operation of the power button were performed by the same person does not necessarily have to be a determination of whether the exact same person performed these operations. For example, a different person that can access the display information may be regarded as the same person in the present context (e.g., another user in the same department).

<System Overview>

FIG. 2 is a diagram illustrating an overall configuration of an image processing system 1 according to an embodiment of the present invention. In FIG. 2, for the sake of simplicity of explanation, only two electronic whiteboards 2a and 2b and associated peripheral devices, such as electronic pens 4a and 4b, are illustrated. However, the image processing system 1 according to the present embodiment may use three or more electronic whiteboards, electronic pens, and the like. As illustrated in FIG. 2, the image processing system 1 includes a plurality of electronic whiteboards 2a and 2b, electronic pens 4a and 4b, USB memories 5a and 5b, notebook PCs (Personal Computers) 6a and 6b, teleconference (video conference) terminals 7a and 7b, and a PC 8 that are communicably connected to each other via a communication network 9. Further, the electronic whiteboards 2a and 2b respectively include displays 3a and 3b.

The electronic whiteboard 2a can control the display 3a to display an image that has been drawn by an event generated by the electronic pen 4a (e.g., an end portion of the electronic pen 4a touching the display 3a), for example. Note that an image being displayed on the display 3a can also be altered based on events other than that generated by the electronic pen 4a, such as events generated by a user's hand Ha (e.g., gestures for enlargement, reduction, page turning), for example.

The USB memory 5a is connectable to the electronic whiteboard 2a. The electronic whiteboard 2a can read an electronic file such as a PDF file from the USB memory 5a, and the electronic whiteboard 2a can record an electronic file in the USB memory 5a, for example. Also, the PC 6a is connected to the electronic whiteboard 2a via a cable 10a1 that is capable of establishing communication according to standards, such as DisplayPort (registered trademark), DVI (Digital Visual Interface), HDMI (High-Definition Multimedia Interface; registered trademark), and VGA (Video Graphics Array), for example. The electronic whiteboard 2a causes an event to be generated in response to a touch of the display 3a and transmits event information indicating this event to the notebook PC 6a in a manner similar to transmitting an event generated by an input device, such as a mouse or a keyboard, for example. Also, the teleconference (video conference) terminal 7a is similarly connected to the electronic whiteboard 2a via a cable 10a2 that is capable of establishing communication according to the above standards. The notebook PC 6a and the teleconference terminal 7a may communicate with the electronic whiteboard 2a by wireless communication conforming to a wireless communication protocol, such as Bluetooth (registered trademark), for example.

Meanwhile, at another location where the electronic whiteboard 2b is installed, the electronic whiteboard 2b including the display 3b, the electronic pen 4b, the USB memory 5b, the notebook PC 6b, the teleconference terminal 7b, a cable 10b1, and a cable 10b2 is used. Note that an image being displayed on the display 3b may be altered based on an event generated by the user's hand Hb, for example.

In this way, an image drawn on the display 3a of the electronic whiteboard 2a installed at one location may also be displayed on the display 3b of the electronic whiteboard 2b at another location. Also, an image drawn on the display 3b of the electronic whiteboard 2b installed at the other location may be displayed on the display 3a of the electronic whiteboard 2a installed at the one location. As described above, the image processing system 1 enables a remote sharing process in which the same image can be shared among devices at remote locations and can therefore be suitably used for conducting a remote conference at remote locations, for example.

In the following descriptions, a given electronic whiteboard from among a plurality of electronic whiteboards may be referred to as "electronic whiteboard 2". Also, a given display from among a plurality of displays may be referred to as "display 3". Also, a given electronic pen from among a plurality of electronic pens may be referred to as "electronic pen 4". Also, a given USB memory from among a plurality of USB memories may be referred to as "USB memory 5". Also, a given notebook PC from among a plurality of notebook PCs may be referred to as "notebook PC 6". Also, a given teleconference terminal from among a plurality of teleconference terminals may be referred to as "teleconference terminal 7". Also, a given hand from among the hands of a plurality of users may be referred to as "hand H". Also, a given cable from among a plurality of cables may be referred to as "cable 10".

Also, note that although an electronic whiteboard is described as an example of an image processing apparatus implementing aspects of the present invention, applications of the present invention are not limited thereto. Other examples of image processing apparatuses that can implement aspects of the present invention include an electronic signage (digital signage), a telestrator, which is often used in sports and weather forecasts, a remote image (video) diagnostic device, and the like. Although the notebook PC 6 is described as an example of an information processing terminal, the present invention is not limited thereto. Other examples of information processing terminals include a desktop PC, a tablet PC, a PDA (personal digital assistant), a digital video camera, a digital camera, and other terminals capable of supplying image frames, such as a game machine, for example. Further, the communication network 9 may include the Internet, a LAN (Local Area Network), a cellular phone communication network, and the like. Also, although a USB memory is described as an example of a recording medium in the present embodiment, the present invention is not limited thereto. Other examples of recording media include an SD card, and other various types of recording media.

<Electronic Whiteboard Hardware Configuration>

In the following, the hardware configuration of the electronic whiteboard according to the present embodiment will be described with reference to FIG. 3. FIG. 3 is a diagram illustrating an example hardware configuration of the electronic whiteboard 2.

As illustrated in FIG. 3, the electronic whiteboard 2 includes a CPU (central processing unit) 101 that controls the overall operation of the electronic whiteboard 2, a ROM (read-only memory) 102 that stores programs, such as an IPL (initial program loader), that are used for driving the CPU 101, a RAM (random access memory) 103 that is used as a work area of the CPU 101, a SSD (solid state drive) 104 that stores various data, such as an application program of the electronic whiteboard 2, a network controller 105 that controls communication with the communication network 9, and an external storage controller 106 that controls communication with the USB memory 5.

The electronic whiteboard 2 also includes a capture device 111 that controls a display of the notebook PC 6 to display video information as a still image or a moving image, a GPU (Graphics Processing Unit) 112 specializing in graphics, and a display controller 113 that controls and manages screen display processes for outputting an output image from the GPU to the display 3 and the teleconference terminal 7.

Further, the electronic whiteboard 2 includes a sensor controller 114 that controls processes of a contact sensor 115 and the contact sensor 115 that detects an object, such as the electronic pen 4 or the user's hand H, touching the display 3. The contact sensor 115 detects coordinates on the display 3 by infrared rays. Two light emitting/receiving devices arranged at two upper side end portions of the display 3 radiate a plurality of infrared rays in parallel to the display 3, the infrared rays are reflected by reflection members arranged around the display 3, and the infrared rays returning along the same optical path as the radiated infrared rays are received by light receiving elements. The contact sensor 115 outputs IDs of two light receiving elements intercepted by an object to the sensor controller 114, and the sensor controller 114 specifies the coordinate position corresponding to the contact position of the object. Note that IDs described below are all examples of identification information. Examples of the object include a finger, the electronic pen 4, and any other object that can block light. Also, the object may be made of a transparent or translucent material, such as glass or plastic, for example.

Also, the contact sensor 115 is not limited to an infrared touch sensor, but may use other various types of detection systems, such as a capacitive type touch panel for specifying a contact position by detecting a change in electrostatic capacity, a resistive type touch panel that specifies a contact position based on a voltage change between two opposing resistive films, and an electromagnetic induction type touch panel that specifies a contact position by detecting an electromagnetic induction caused by an object coming into contact with a display, for example.

Also, the electronic whiteboard 2 includes an electronic pen controller 116. The electronic pen controller 116 communicates with the electronic pen 4 to determine whether the electronic pen 4 has touched the display 3.

The electronic whiteboard 2 further includes a bus line 120, such as an address bus or a data bus, for electrically connecting the CPU 101, the ROM 102, the RAM 103, the SSD 104, the network controller 105, the external storage controller 106, the capture device 111, the GPU 112, the sensor controller 114, and the electronic pen controller 116 as illustrated in FIG. 3.

The electronic whiteboard 2 also includes a power button 119 that is connected to the bus line 120. The power button 119 is used by a user to turn on or turn off the power of the electronic whiteboard 2. When the power button 119 is turned on, power is supplied to the electronic whiteboard 2, and when the power button 119 is turned off, power is shut down after undergoing a predetermined termination process (alternatively, the operation mode may be switched to standby mode). More specifically, when the power button 119 is turned on, an OS (Operating System) for enabling the electronic whiteboard 2 to operate as an information processing apparatus and an application program of the electronic whiteboard 2 are activated. When the power button 119 is turned off, the CPU 101 detects the power-off operation of the power button 119 as an interrupt, and the CPU 101 stops operation of the electronic whiteboard 2 as an information processing apparatus. Note that stopping the operation of the electronic whiteboard 2 may include shutting down the electronic whiteboard 2 so that it does not consume electric power as well as transitioning to standby mode (also referred to as "sleep mode") or some other state in which the electronic whiteboard 2 still consumes electric power.

The power button 119 may be a button that is mechanically turned on/off. Alternatively, the power button 119 may be a button having a movable part. For example, the power button 119 may be a push button or a lever type switch. When the power button 119 is turned on, the electronic whiteboard 2 maintains a power-on state even when the user releases his/her hand from the power button 119. The user performing an operation of pressing the power button 119 while the electronic whiteboard is in the power-on state corresponds to a power-off operation. The power button 119 may be arranged at a side surface of the electronic whiteboard 2, for example, along with other buttons (e.g., direction key button, menu display button, input type switch button for an interface, such as HDMI, to which video information of the notebook PC 6 is input). The position of the power button 119 is not limited to the side surface of the electronic whiteboard 2 and may also be at some other position, such as the front surface or the back surface, where the user can readily operate the power button 119.

Also, the electronic whiteboard 2 includes a remote control device controller 121 that is connected to the bus line 120. The remote control device controller 121 communicates with a remote control device 11 using infrared rays, radio waves or the like, and receives a command from the remote control device 11. The remote control device 11 is a terminal for enabling the user to remotely control the electronic whiteboard 2. The remote control device 11 includes at least a remote power button 11a. Instead of operating the power button 119, the user can operate the remote power button 11a to send a power-on command or an power-off command to the electronic whiteboard 2 to turn on or turn off its power.

Note that an application program for the electronic whiteboard 2 may be distributed in the form of a computer-readable recording medium, such as a CD-ROM, having the application program recorded thereon.

<Electronic Whiteboard Functional Configuration>

Figure 4:
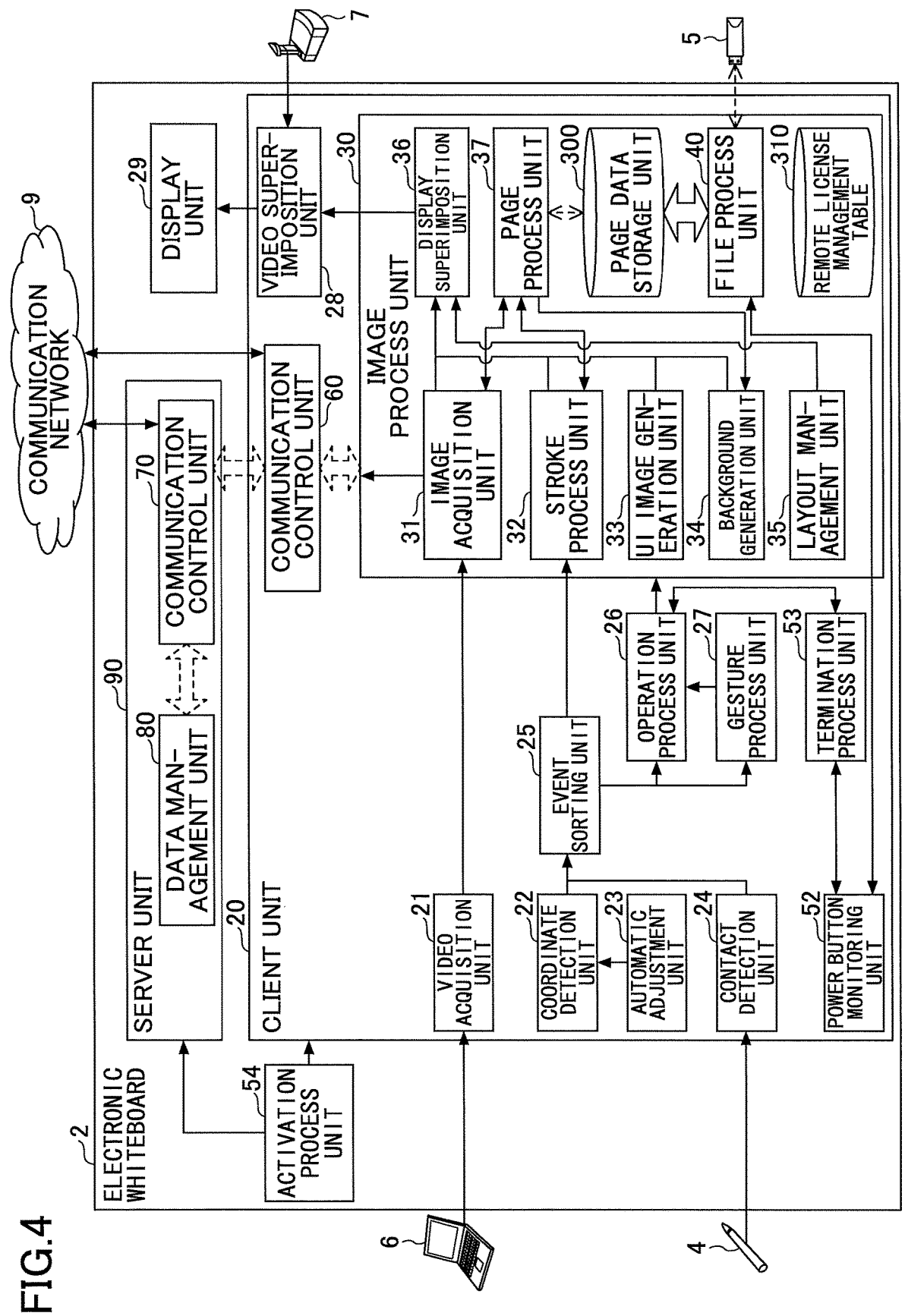
FIG. 4 is a diagram illustrating an example functional configuration of the electronic whiteboard.

In the following, the functional configuration of the electronic whiteboard 2 will be described with reference to FIGS. 4-7. First, with reference to FIG. 4, the overall functional configuration of the electronic whiteboard 2 will be described. FIG. 4 is a block diagram illustrating an example functional configuration of the electronic whiteboard 2.

The electronic whiteboard 2 may implement the functional configuration as illustrated in FIG. 4 using the hardware configuration as illustrated in FIG. 3 to run an application program, for example. The electronic whiteboard 2 can act as a "host device" that initially starts a remote sharing process as well as a "participating device" that participates in a remote sharing process that has already been started. Also, note that functions of the electronic whiteboard 2 can be roughly divided into a client unit 20 and a server unit 90. Functions of the client unit 20 and the server unit 90 may be implemented within one unit structure of the electronic whiteboard 2. When the electronic whiteboard 2 acts as a host device, the functions of the client unit 20 and the server unit 90 are implemented in the electronic whiteboard 2. When the electronic whiteboard 2 acts as a participating device, the functions of the client unit 20 are implemented in the electronic whiteboard 2, but the functions of the server unit 90 are not implemented. For example, referring to FIG. 2, assuming that the electronic whiteboard 2a acts as the host device and the electronic whiteboard 2b acts as the participating device, the client unit 20 of the electronic whiteboard 2a communicates with the client unit 20 of the other electronic whiteboard 2b via the server unit 90 that is implemented in the electronic whiteboard 2a. On the other hand, the client unit 20 of the electronic whiteboard 2b communicates with the client unit 20 of the electronic whiteboard 2a via the server unit 90 that is implemented in the electronic whiteboard 2a.

The electronic whiteboard 2 also includes an activation process unit 54. The activation process unit 54 operates when the power button 119 of the electronic whiteboard 2 is turned on and an application program for controlling the operation of the electronic whiteboard 2 is activated. The application program may be activated by the OS that has been activated. The activation process unit 54 performs initial processes for operating the electronic whiteboard 2. For example, when page data is stored in a page data storage unit 300, the activation process unit 54 may cause a recovery process unit 41 to perform a recovery process. Also, irrespective of whether a recovery process is performed, the activation process unit 54 initializes the page data storage unit 300. Also, if the activation process unit 54 is set up to perform user authentication, the activation process unit 54 may display a passcode input field and determine whether a correct passcode has been input. Also, if the activation process unit 54 is set up to generate (update) a passcode at the time the electronic whiteboard 2 is activated, the activation process unit 54 may generate a passcode (alternatively, the passcode may be fixed in some embodiments).

[Functional Configuration of Client Unit 20]

Figure 5:
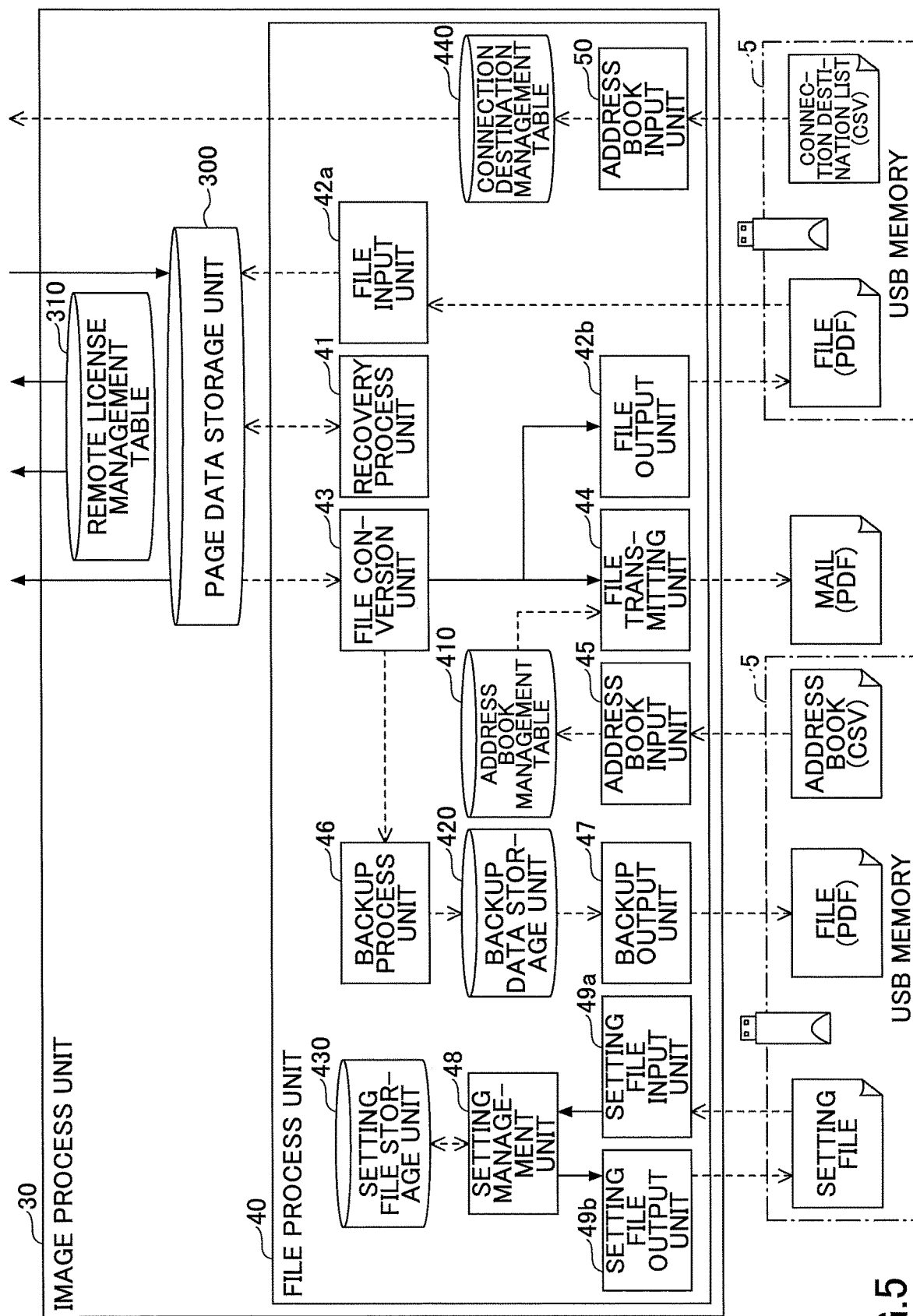
FIG. 5 is a diagram illustrating an example functional configuration of a file process unit.
Figure 6:
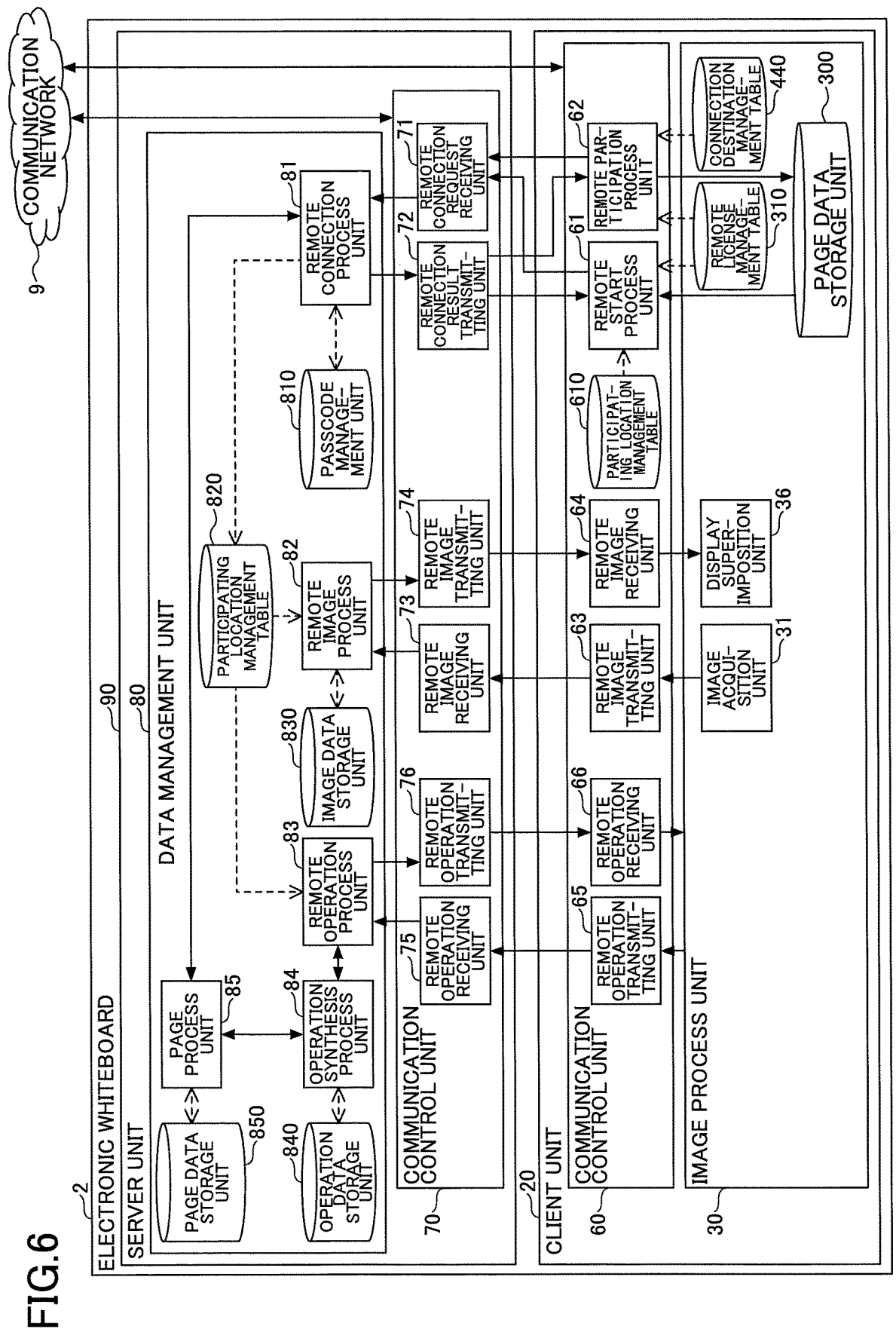
FIG. 6 is a diagram illustrating example functional configurations of a server unit and a client unit.

In the following, the functional configuration of the client unit 20 is mainly described with reference to FIGS. 4-6. The client unit 20 includes a video acquisition unit 21, a coordinate detection unit 22, an automatic adjustment unit 23, a contact detection unit 24, an event sorting unit 25, an operation process unit 26, a gesture process unit 27, a video superimposition unit 28, a power button monitoring unit 52, a termination process unit 53, an image process unit 30, and a communication control unit 60.

The video acquisition unit 21 acquires an output image of a video output device that is connected to the cable 10. Upon receiving an image signal from the video output device, the video acquisition unit 21 analyzes the image signal to derive image information, such as the resolution of the image frame corresponding to the display image of the video output device that is formed by the image signal and the update frequency of the image frame, and outputs the derived image information to an image acquisition unit 31.

The coordinate detection unit 22 detects the coordinate position of an event generated by the user with respect to the display 3 (e.g., an action of the user's hand H touching the display 3). The coordinate detection unit 22 also detects the area of a touched region.

The automatic adjustment unit 23 is activated when the electronic whiteboard 2 is activated. The automatic adjustment unit 23 adjusts parameters to be used by the coordinate detection unit 22 upon processing a sensor camera image so that the coordinate detection unit 22 that detects coordinates using optical sensor technology can output appropriate detection values.

The contact detection unit 24 detects an event generated by the user (e.g., a pen tip of the electronic pen 4 or a pen bottom of the electronic pen 4 pressing (touching) the display 3).

The event sorting unit 25 sorts events into a stroke drawing, a UI operation, or a gesture operation based on the coordinate position of the event detected by the coordinate detection unit 22 and the detection result of the contact detection unit 24. Note that in the present description, the event "stroke drawing" occurs while a stroke image (B) as illustrated in FIG. 7 (described below) is displayed on the display 3 and refers to an event that extends from the time the user presses the electronic pen 4 onto the display 3 and moves the electronic pen 4 while keeping it pressed against the display 3 until the time the user ultimately releases the electronic pen 4 from the display 3. For example, an alphabet, such as "S" or "T", may be drawn on the display 3 by the stroke drawing event. Note that "stroke drawing" includes not only drawing an image but also deleting an already drawn image or editing a drawn image, for example.

The event "UI operation" occurs while a UI image (A) as illustrated in FIG. 7 (described below) is displayed on the display 3 and refers to an event in which the user presses a predetermined position with the electronic pen 4 or the hand H. For example, the color and/or width of a line drawn by the electronic pen 4 may be specified by the UI operation event.

The event "gesture operation" occurs while the stroke image (B) as illustrated in FIG. 7 (described below) is displayed on the display 3 and refers to an event in which the user touches or swipes the display 3 with the hand H. For example, the gesture operation event may involve the user sliding a finger on the display 3 to enlarge (or reduce) the size of a display image, change a display region, or turn a page.

The operation process unit 26 executes various operations for events that have been determined to correspond to UI operations by the event sorting unit 25. The operation process unit 26 may execute different types of operations depending on a UI element that has been operated in the UI operation event. Examples of UI elements include buttons, lists, checkboxes, textboxes, and the like. The gesture process unit 27 executes a corresponding operation for an event that has been determined to correspond to a gesture operation by the event sorting unit 25.

The video superimposition unit 28 displays a superimposed image generated by a display superimposition unit 36 (described below) on the display unit 29. The display unit 29 implements display functions of the display 3. Also, the video superimposition unit 28 performs a picture-in-picture process for displaying video from one video output device (e.g., the teleconference terminal 7) within video from another video output device (e.g., the notebook PC 6). Further, the video superimposition unit 28 performs switching operations for displaying the video displayed as a picture-in-picture within a portion of the display unit 29 on the entire display unit 29.

The image process unit 30 performs a process of superimposing image layers as illustrated in FIG. 7, for example. The image process unit 30 includes an image acquisition unit 31, a stroke process unit 32, a UI image generation unit 33, a background generation unit 34, a layout management unit 35, a display superimposition unit 36, a page process unit 37, a file process unit 40, page data storage unit 300, and a remote license management table 310. The page data storage unit 300 and the remote license management table 310 may be implemented by a nonvolatile memory, such as the SSD 104 or the USB memory 5, for example. Alternatively, if power is supplied to the RAM 103 even when operation of the electronic whiteboard 2 is stopped, the page data storage unit 300 and the remote license management table 310 may be implemented by the RAM 103, for example.

The image acquisition unit 31 acquires an image of each frame from the video acquired by the video acquisition unit 21. The image acquisition unit 31 outputs data of the acquired image to the page process unit 37. The acquired image corresponds to an output image (C) as illustrated in FIG. 7 that is output from a video output device (e.g., notebook PC 6).

The stroke process unit 32 draws an image, deletes a drawn image, or edits a drawn image based on an event relating to stroke drawing identified by the event sorting unit 25. The image resulting from such an event relating to stroke drawing corresponds to the stroke image (B) as illustrated in FIG. 7. The results of drawing, deleting, or editing an image based on an event related to stroke drawing are stored in an operation data storage unit 840 as operation data, which will be described below.

The UI image generation unit 33 generates a UI (user interface) image that is preset in the electronic whiteboard 2. The UI image corresponds to a UI image (A) as illustrated in FIG. 7.

The background generation unit 34 receives from the page process unit 37, media data included in page data read out from the page data storage unit 300 by the page process unit 37. The background generation unit 34 outputs the received media data to the display superimposition unit 36. The image based on the media data corresponds to a background image (D) as illustrated in FIG. 7. The background image (D) may be a solid image or a patterned image having a grid pattern or the like, for example.

The layout management unit 35 manages layout information that prescribes the layout of images output from the image acquisition unit 31, the stroke process unit 32, and the UI image generation unit 33 (or the background generation unit 34). In this way, the layout management unit 35 can provide directions to the display superimposition unit 36 regarding the positions within the UI image (A) or the background image (D) at which the output image (C) and the stroke image (B) are to be displayed or whether one or more of these images should be hidden (not displayed), for example.

The display superimposition unit 36 lays out the images output from the image acquisition unit 31, the stroke process unit 32, and the UI image generation unit 33 (or the background generation unit 34) based on the layout information output from the layout management unit 35.

The page process unit 37 stores data of the stroke image (B) and data of the output image (C) as one set of page data in the page data storage unit 300. Note that the data of the stroke image (B) is referred to as stroke array data (stroke data of strokes) and has a stroke array data ID assigned thereto as indicated in Table 1 below. The stroke array data constitutes a part of the page data. The data of the output image (C) is referred to as media data and has a media data ID assigned thereto as indicated in Table 4 below. The media data constitutes a part of the page data. When the media data is read out from the page data storage unit 300, it is handled as data of the background image (D).

Also, the page process unit 37 can transmit the media data included in the page data that has been stored in the page data storage unit 300 to the display superimposition unit 36 via the background generation unit 34 and cause the display 3 to redisplay the media data as the background image (D). Also, the page process unit 37 can transmit the stroke array data (stroke data of strokes) included in the page data to the stroke process unit 32 to enable image reediting through stroke drawing. Further, the page process unit 37 can delete or duplicate the page data.

That is, the data of the output image (C) displayed on the display 3 at the time the page process unit 37 stores page data in the page data storage unit 300 is temporarily stored in the page data storage unit 300 as media data of the page data, and when the media data is subsequently read out from the page data storage unit 300, it is read out as media data representing the background image (D). The page process unit 37 outputs the stroke array data representing the stroke image (B) that is included in the page data read out from the page data storage unit 300 to the stroke process unit 32. Further, the page process unit 37 outputs the media data representing the background image (D) that is included in the page data read out from the page data storage unit 300 to the background generation unit 34.

The display superimposition unit 36 superimposes the output image (C) from the image acquisition unit 31, the stroke image (B) from the stroke process unit 32, the UI image (A) from the UI image generation unit 33, and the background image (D) from the background generation unit 34 according to the layout specified by the layout management unit 35. In this away, as illustrated in FIG. 7, the UI image (A), the stroke image (B), the output image (C), and the background image (D) are layered in a prescribed order so that the user can view each of the images even when they overlap with one another.

Also, the display superimposition unit 36 may superimpose only one of the image (C) or the image (D) of FIG. 7 on the image (A) and the image (B). For example, assuming the image (A), the image (B) and the image (C) are initially displayed, when the cable 10 establishing the connection between the electronic whiteboard 2 and the video output device (e.g., notebook PC 6) is unplugged, the display superimposition unit 36 may exclude the image (C) from the images to be superimposed and have the image (D) displayed based on a corresponding specification from the layout management unit 35. The display superimposition unit 36 may also perform processes for enlarging the display, reducing the display, and moving a display region, for example.

The page data storage unit 300 stores page data as illustrated in Table 1, for example.

TABLE 1

| PAGE DATA ID | START TIME | END TIME | STROKE ARRAY DATA ID | MEDIA DATA ID |
|---|---|---|---|---|
| p001 | 20130610102434 | 20130610102802 | st001 | m001 |
| p002 | 20130610102815 | 20130610103225 | st002 | m002 |
| p003 | 20130610103545 | 20130610104233 | st003 | m003 |
| . | . | . | . | . |
| . | . | . | . | . |
| . | . | . | . | . |

Table 1 is a conceptual representation of page data. One set of page data (stroke array data and media data) corresponds to data of one page that was displayed on the display 3. Note that because page data includes many parameters, the contents of page data will be described using Tables 1-4.

As indicated in Table 1, page data includes a page data ID for identifying one given page; a start time indicating the time at which the page started being displayed; an end time indicating the time at which rewriting of the page content through stroke, gesture, or the like has ceased, a stroke array data ID for identifying the stroke array data generated by strokes of the electronic pen 4 or the user's hand H; and a media data ID for identifying the media data that are stored in association with each other. The stroke array data is data for displaying the stroke image (B) as illustrated in FIG. 7 (described below) on the display 3. The media data is data for displaying the background image (D) as illustrated in FIG. 7 (described below) on the display 3.

For example, when the user draws the alphabet "S" with the electronic pen 4, because the alphabet "S" can be written in a single stroke, one alphabet letter (S) may be represented by one stroke data ID. However, when the user draws the alphabet "T" with the electronic pen 4, for example, because the alphabet "T" is written with two strokes, one alphabet letter (T) will be represented by two stroke data IDs.

Also, the stroke array data includes further detailed information as indicated in Table 2, which is shown in FIG. 21. Table 2 is a conceptual representation of the stroke array data. As can be appreciated from Table 2, one set of stroke array data is represented by a plurality of sets of stroke data. One set of stroke data includes a stroke data ID for identifying the stroke data of one stroke, a start time indicating the writing start time of the one stroke, an end time indicating the writing end time of the one stroke, the color of the stroke, the width of the stroke, and a coordinate array data ID for identifying passage points of the stroke.

Further, the coordinate array data includes detailed information as indicated in Table 3, which is shown in FIG. 22. Table 3 is a conceptual representation of the coordinate array data. As shown in Table 3, the coordinate array data includes information relating to one point (X coordinate value, Y coordinate value) on the display 3, a time difference (ms) between the start time of the stroke and the time the stroke passes through the one point, and the pen pressure of the electronic pen 4 at this one point. That is, a collection of single points as indicated in Table 3 is represented by one set of coordinate array data indicated in Table 2. For example, when the user draws the alphabet "S" with the electronic pen 4, although the alphabet "S" is written in a single stroke, it passes through a plurality of passage points before the drawing of "S" is completed. The coordinate array data represents information relating to the plurality of passage points.

Further, the media data of the page data indicated in Table 1 includes detailed information as indicated in Table 4.

TABLE 4

| MEDIA DATA ID | DATA TYPE | RECORDING TIME | X COORDINATE VALUE | Y COORDINATE VALUE | WIDTH | HEIGHT | DATA |
|---|---|---|---|---|---|---|---|
| m001 | IMAGE | 20130610103432 | 0 | 0 | 1920 | 1080 | abc.jpg |
| m002 | IMAGE | 20130610105402 | 277 | 156 | 1366 | 768 | bcd.jpg |
| m003 | IMAGE | 20130610105017 | 277 | 156 | 1366 | 768 | cde.jpg |
| . | . | . | . | . | . | . | . |
| . | . | . | . | . | . | . | . |
| . | . | . | . | . | . | . | . |

Table 4 is a conceptual representation of the media data. As can be appreciated from Table 4, the media data includes the media data ID included in the page data indicated in Table 1, the data type of the media data, the recording time at which the media data was stored in the page data storage unit 300 by the page process unit 37, the position (X coordinate value, Y coordinate value) of an image to be displayed on the display 3 based on the page data, the size (width, height) of the image, and data indicating the image of the media data that are stored in association with each other. Note that the position of the image can be specified based on the upper left end position (X coordinate value, Y coordinate value) of the image displayed on the display 3 based on the page data.

Referring back to FIG. 4, the remote license management table 310 manages license data necessary for executing a remote sharing process. As indicated in Table 5 below, the remote license management table 310 manages a product ID of the electronic whiteboard 2, a license ID used for authentication, and an expiration date of the license in association with each other.

TABLE 5

| PRODUCT ID | LICENSE ID | EXPIRATION DATE |
|---|---|---|
| 1001 | 12345678abcdefgh | 2012 Dec. 31 |
| 1001 | 4321dcba8765hgfe | — |
| . | . | . |

TABLE 5-continued

| PRODUCT ID | LICENSE ID | EXPIRATION DATE |
|---|---|---|
| . | . | . |
| . | . | . |

Referring back to FIG. 4, the power button monitoring unit 52 detects that the power button 119 has been turned off and communicates a power-off request to the file process unit 40. That is, the power button monitoring unit 52 detects that the power button 119 has been turned off by interrupting the CPU 101. Upon acquiring a saving completion notification indicating that the process of saving display information has been completed from the file process unit 40, the power button monitoring unit 52 communicates a termination process request to the termination process unit 53.

The termination process unit 53 performs a termination process for stopping operation of the electronic whiteboard 2. The termination process unit 53 may implement conventional functions for terminating the operation of a device. For example, the termination process unit 53 may execute processes, such as transferring data stored in the RAM 103 of the electronic whiteboard 2 (e.g., setting information set up in a setting file by the user) to the SSD 104, storing an operation end time, and initializing the page data storage unit 300. By initializing the page data storage unit 300, page data may be prevented from being viewed when another user uses the electronic whiteboard 2.

Thereafter, an API (Application Programming Interface) of the OS that performs a shutdown process or a process of transitioning to standby mode may be called, and the application program and the OS of the electronic whiteboard 2 may be terminated so that operation of the electronic whiteboard 2 may be stopped. Note that the termination process unit 53 may also implement functions similar to those described above upon receiving a termination process request from the operation process unit 26.

(Functional Configuration of File Process Unit 40)

In the following, the functional configuration of the file process unit 40 illustrated in FIG. 4 will be described with reference to FIG. 5. FIG. 5 is a block diagram illustrating an example functional configuration of the file process unit 40. The file process unit 40 includes a recovery process unit 41, a file input unit 42a, a file output unit 42b, a file conversion unit 43, a file transmitting unit 44, an address book input unit 45, a backup process unit 46, a backup output unit 47, a setting management unit 48, a setting file input unit 49a, and a setting file output unit 49b. Further, the file process unit 40 includes an address book management table 410, a backup data storage unit 420, a setting file storage unit 430, and a connection destination management table 440. The address book management table 410, the backup data storage unit 420, the setting file storage unit 430, and the connection destination management table 440 may be implemented by a nonvolatile memory, such as the SSD 104 or the USB memory 5 of FIG. 3, for example. Alternatively, if power is supplied to the RAM 103 even when the operation of the electronic whiteboard 2 is stopped, the above units and tables may be implemented by the RAM 103, for example.

The recovery process unit 41 detects abnormal termination after the electronic whiteboard 2 undergoes abnormal termination and recovers unsaved page data. For example, in the case of normal termination (when an end icon as described below is pressed), the page data is recorded as a PDF file in the USB memory 5 via the file process unit 40.

On the other hand, in the case of an abnormal termination, such as a power failure, the page data is still recorded in the page data storage unit 300. Accordingly, when the power is turned on again, the recovery process unit 41 recovers the page data by reading out the page data from the page data storage unit 300. Note that the recovery process unit 41 will be described in detail below with reference to FIG. 8.

The file input unit 42a reads out the PDF file from the USB memory 5 and stores each page as page data in the page data storage unit 300. The file conversion unit 43 converts the page data stored in the page data storage unit 300 into a PDF format file.

The file output unit 42b records the PDF file output by the file conversion unit 43 in the USB memory 5.

The file transmitting unit 44 attaches the PDF file generated by the file conversion unit 43 to an e-mail and transmits the PDF file to a designated transmission destination. The file transmitting unit 44 may determine the transmission destination of the PDF file by accepting an operation of the user selecting a desired destination from a display of the contents of the address book management table 410 displayed on the display 3 by the display superimposition unit 36, for example. The address book management table 410 may have a name of a destination and an e-mail address of the destination stored in association with each other, as indicated in Table 6 below.

TABLE 6

| NAME | EMAIL ADDRESS |
|---|---|
| TARO | taro@alpha.co.jp |
| HANAKO | hanako@beta.co.jp |
| — | jiro@gamma.co.jp |
| . | . |
| . | . |
| . | . |

The file transmitting unit 44 may also accept an operation of the user inputting an e-mail address as the transmission destination, for example.

The address book input unit 45 reads out an e-mail address list file from the USB memory 5 and stores the e-mail address list file in the address book management table 410.

The backup process unit 46 performs a backup process of storing the file output by the file output unit 42b and the file transmitted by the file transmitting unit 44 in the backup data storage unit 420. The backup data is stored in PDF format as indicated in Table 7 below.

TABLE 7

| FLAG | BACKUP DATA | CONFERENCE ID |
|---|---|---|
|  | iwb_20130610104423.pdf | 1234 |
|  | iwb_20130625152245.pdf | 2345 |
|  | iwb_20130628113418.pdf | 3456 |
|  | . | 4567 |
|  | . |  |
| F | iwb_20130922131432.pdf | — |

Thus, when the electronic whiteboard 2 undergoes normal termination, one record (PDF file) of backup data is stored in Table 7. One PDF file in Table 7 contains all the page data of one conference. Also, a PDF file may be created when the user performs a page data saving process at a given time (when the user presses a read and save icon as described below). When the saving process is performed multiple times, the PDF file is updated accordingly. The file name of the PDF file may include the current time (creation time of the PDF file) acquired by the termination process unit 53, for example. As will be described below, the PDF file is associated with a conference ID that is assigned by the user. The user can reproduce page data by specifying the PDF file with the relevant conference ID assigned thereto. The conference ID is identification information for uniquely identifying a PDF file. The user can also assign a file name to the PDF file.

Further, the backup data includes a flag field. A flag "F" is registered in the flag field of backup data that has been created as a result of a power button related process. In this way, the electronic whiteboard 2 can use the flag to determine the presence/absence of saved data. Note that backup data having the flag "F" registered therein is not associated with a conference ID because such backup data is stored without the user inputting (assigning) a conference ID for the backup data.

Referring back to FIG. 5, the backup output unit 47 stores a backup file of the backup data in the USB memory 5. Upon storing the backup file, the user may input a password for security purposes.

The setting management unit 48 manages various types of setting information of the electronic whiteboard 2 by storing the setting information in the setting file storage unit 430 and reading the setting information from the setting file storage unit 430, for example. The various types of setting information may include network settings, date and time settings, regional and language settings, mail server settings, address book settings, connection destination list settings, and backup settings, for example. The network settings may include an IP address setting, a net mask setting, a default gateway setting, and a DNS (Domain Name System) setting of the electronic whiteboard 2, for example.

The setting file output unit 49b records various types of setting information of the electronic whiteboard 2 in the USB memory 5 as a setting file. The setting file is protected so that the user cannot see the contents thereof.

The setting file input unit 49a reads the setting file stored in the USB memory 5 and reflects the various types of setting information on various settings of the electronic whiteboard 2.

The address book input unit 50 reads a connection destination IP address list file for a remote sharing process from the USB memory 5 and stores the connection destination IP address list file in the connection destination management table 440. Table 8 below represents an example configuration of the connection destination management table 440.

TABLE 8

| NAME | IP ADDRESS |
| --- | --- |
| CONFERENCE ROOM 1 | 192.0.0.1 |
| CONFERENCE ROOM 2 | 192.0.0.2 |
| — | 192.0.0.3 |
| . | . |
| . | . |
| . | . |

In the case where the electronic whiteboard 2 acts as a participating device of a remote sharing process, by having the connection destination management table 440, the user of the participating device may be relieved of the trouble of inputting the IP address of an electronic whiteboard 2 that acts as a host device of the remote sharing process. The connection destination management table 440 manages the name of an installation location of an electronic whiteboard 2 that is to act as a host device of a remote sharing process in which the participating device can participate and the IP address of the host device in association with each other.

Note that the connection destination management table 440 does not necessarily have to be provided. However, in this case, the user of the participating device will have to us a touch panel or the like to input the IP address of a host device in order to start a remote sharing process with the host device. The user of the participating device may acquire the IP address of the host device from the user of the host device via telephone or e-mail, for example.

(Functional Configuration of Communication Control Unit 60)

In the following, the functional configuration of the communication control unit 60 will be described with reference to FIG. 6. FIG. 6 is a block diagram illustrating example functional configurations of the server unit 90 and the client unit 20. The communication control unit 60 controls communication with another electronic whiteboard 2 and communication with a communication control unit 70 (described below) of the server unit 90 via the communication network 9. As such, the communication control unit 60 includes a remote start process unit 61, a remote participation process unit 62, a remote image transmitting unit 63, a remote image receiving unit 64, a remote operation transmitting unit 65, a remote operation receiving unit 66, and a participating location management table 610.

The remote start process unit 61 transmits a remote sharing process start request to start a new remote sharing process to the server unit 90 of the same electronic whiteboard 2, and receives a response to the remote sharing process request from the server unit 90. The remote start process unit 61 refers to the remote license management table 310 to check whether license information (product ID, license ID, and expiration date) is stored therein, and if the license information is stored the remote start process unit 61 can transmit a remote sharing process start request. However, if the license information is not stored, the remote start process unit 61 cannot transmit a remote sharing process start request.

The participating location management table 610 is used when the electronic whiteboard 2 acts as a host device of a remote sharing process and is a table for managing one or more electronic whiteboard 2 that are currently participating in the remote sharing process as participating devices. Table 9 below illustrates an example configuration of the participating location management table 610.

TABLE 9

| NAME | IP ADDRESS |
| --- | --- |
| CONFERENCE ROOM 1 | 192.0.0.1 |
| CONFERENCE ROOM 2 | 192.0.0.2 |
| — | 192.0.0.8 |
| . | . |
| . | . |
| . | . |

The above participating location management table 610 stores the name of the installation location of the participating device participating in the remote sharing process and the IP address of the electronic whiteboard 2 corresponding to the participating device in association with each other.

The remote participation process unit 62 transmits a remote sharing process participation request to the remote connection request receiving unit 71 of the server unit 90 of the electronic whiteboard 2 acting as the host device of the remote sharing process via the communication network 9. The remote participation process unit 62 also refers to the remote license management table 310. Also, when the remote participation process unit 62 is to participate in the remote sharing process, the remote participation process unit 62 may refer to the connection destination management table 440 to acquire the IP addresses of the conference room where the host device of the remote sharing process is located. Note that the IP address of the conference room may alternatively be input by an operation of the user rather than having the remote participation process unit 62 refer to the connection destination management table 440.

The remote image transmitting unit 63 transmits to the server unit 90, the output image (C) that has been acquired from the video acquisition unit 21 via the image acquisition unit 31.

The remote image receiving unit 64 receives from the server unit 90, image data from a video output device connected to another electronic whiteboard 2, and outputs the received image data to the display superimposition unit 36 to thereby participate in a remote sharing process.

The remote operation transmitting unit 65 transmits various types of operation data necessary for a remote sharing process to the server unit 90. Examples of the various types of operation data include data relating to addition of a stroke, deletion of a stroke, editing (enlarging, reducing, moving) of a stroke, storage of page data, creation of page data, duplication of page data, deletion of page data, page turning, and the like. Further, the remote operation receiving unit 66 receives operation data input to another electronic whiteboard 2 from the server unit 90 and outputs the received operation data to the image process unit 30.

[Server Unit Functional Configuration]

In the following, the functional configuration of the server unit 90 will be described with reference to FIG. 6. The server unit 90 is implemented in all the electronic whiteboards 2. The server unit 90 includes a communication control unit 70 and a data management unit 80.

(Functional Configuration of Communication Control Unit 70)

In the following, the functional configuration of the communication control unit 70 will be described with reference to FIG. 6.

The communication control unit 70 controls communication with the communication control unit 60 of the client unit 20 of the same electronic whiteboard 2 and communication with the communication control unit 60 of the client unit 20 of another electronic whiteboard 2. The data management unit 80 manages operation data, image data, and the like.

The communication control unit 70 includes a remote connection request receiving unit 71, a remote connection result transmitting unit 72, a remote image receiving unit 73, a remote image transmitting unit 74, a remote operation receiving unit 75, and a remote operation transmitting unit 76.

The remote connection request receiving unit 71 receives a remote sharing process start request from the remote start process unit 61, and receives a remote sharing process participation request from the remote participation process unit 62, for example. The remote connection result transmitting unit 72 transmits a response to the remote sharing process start request to the remote start process unit 61 and transmits a response to the remote sharing process participation request to the remote participation process unit 62.

The remote image receiving unit 73 receives the image data (data of the output image (C)) from the remote image transmitting unit 63 and transmits the received image data to a remote image process unit 82 (described below). The remote image transmitting unit 74 receives image data from the remote image process unit 82 and transmits the received image data to the remote image receiving unit 64.

The remote operation receiving unit 75 receives operation data (e.g., data of the stroke image (B)) from the remote operation transmitting unit 65 and transmits the received operation data to a remote operation process unit 83 (described below). The remote operation transmitting unit 76 receives operation data from the remote operation process unit 83 and transmits the received operation data to the remote operation receiving unit 66.

(Functional Configuration of Data Management Unit 80)

In the following, the functional configuration of the data management unit 80 will be described with reference to FIG. 6. The data management unit 80 includes a remote connection process unit 81, the remote image process unit 82, the remote operation process unit 83, an operation synthesis process unit 84, and a page process unit 85. Further, the data management unit 80 includes a passcode management unit 810, a participating location management table 820, an image data storage unit 830, an operation data storage unit 840, and a page data storage unit 850.

The remote connection process unit 81 starts a remote sharing process and terminates the remote sharing process. Also, the remote connection process unit 81 checks the presence/absence of a license and the validity of the license based on license information received by the remote connection request receiving unit 71 together with a remote sharing process start request from the remote start process unit 61 or license information received by the remote connection request receiving unit 71 together with a remote sharing process participation request from the remote participation process unit 62. Further, the remote connection process unit 81 checks whether the number of remote sharing process participation requests received from other electronic whiteboards 2 exceeds a predetermined number of participants that are allowed to participate in the remote sharing process.

Further, the remote connection process unit 81 determines whether a passcode transmitted by another electronic whiteboard 2 upon making a remote sharing process participation request is identical to a passcode stored in the passcode management unit 810. If the passcodes are identical, the remote connection process unit 81 allows participation in the remote sharing process. Note that the passcode is issued by the remote connection process unit 81 upon starting a new remote sharing process. The user of the host device may communicate the issued passcode to one or more users of participating devices that will be participating in the remote sharing process via telephone or e-mail, for example. In this way, when a user of a participating device that is to participate in the remote sharing process inputs the passcode to the participating device and makes a participation request, the participating device may be allowed to participate in the remote sharing process. Note that in a case where user convenience is prioritized over security, passcode confirmation may be omitted and only license verification may be performed, for example.

When the electronic whiteboard 2 acts as a host device, the remote connection process unit 81 acquires participating location information included in a remote sharing process participation request transmitted from the remote participation process unit 62 of a participating device via the communication network 9 and stores the acquired participating location information in the participating location management table 820 of the server unit 90 as remote location information. Then, the remote connection process unit 81 reads out the remote location information stored in the participating location management table 820 and transmits the remote location information to the remote connection result transmitting unit 72. The remote connection result transmitting unit 72 transmits the remote location information to the remote start process unit 61 of the client unit 20 of the same host device. The remote start process unit 61 stores the remote location information in the participating location management table 610. In this way, the host device stores and manages the remote location information in both the client unit 20 and the server unit 90.

The remote image process unit 82 receives image data from each video output device (e.g., notebook PC 6) connected to the client unit 20 of each electronic whiteboard 2 participating in the remote sharing process (including the client unit 20 of its own electronic whiteboard 2 corresponding to the host device) and stores the received image data in the image data storage unit 830. Also, the remote image process unit 82 determines a display order of the image data based on the time at which the image data from each video output device was received at the server unit 90 of the electronic whiteboard 2 corresponding to the host device. Also, the remote image process unit 82 refers to the participating location management table 820 and transmits the image data according to the above determined display order to all the client units 20 (including the client unit 20 of its own electronic whiteboard 2 corresponding to the host device) of all the electronic whiteboards 2 participating in the remote sharing process via the communication control unit 70 (remote image transmitting unit 74).

The remote operation process unit 83 receives various types of operation data (e.g., stroke image (B)), such as a stroke image drawn at each electronic whiteboard 2 participating in the remote sharing process (including its own electronic whiteboard 2) and determines a display order of corresponding images based on the time at which each image was received at the server unit 90 of the electronic whiteboard 2 corresponding to the host device. Note that the various types of operation data received by the remote operation process unit 83 may be substantially the same as the above-described various types of operation data. Also, the remote operation process unit 83 refers to the participating location management table 820 and transmits operation data to all the client units 20 (including the client unit 2 of its own electronic whiteboard 2 corresponding to the host device) of all the electronic whiteboards 2 participating in the remote sharing process.

The operation synthesis process unit 84 synthesizes the operation data of each electronic whiteboard 2 output from the remote operation process unit 83, stores the synthesized operation data in the operation data storage unit 840, and supplies the synthesized operation data to the remote operation process unit 83 at the same time. The synthesized operation data is transmitted from the remote operation transmitting unit 76 to each of the client unit 20 of the electronic whiteboard 2 corresponding to the host device and the client units 20 of the electronic whiteboards 2 corresponding to the participating devices so that an image corresponding to the same operation data can be displayed at each electronic whiteboard 2. Table 10 below illustrates an example of operation data.

TABLE 10

| SEQ | OPERATION NAME | SENDER IP ADDRESS: PORT NO. | DESTINATION IP ADDRESS: PORT NO. | OPERATION TYPE | OPERATION TARGET (PAGE DATA ID/ STROKE DATA ID) | DATA |
|---|---|---|---|---|---|---|
| 1 | ADD | 192.0.0.1: 50001 | 192.0.0.1: 50000 | STROKE | p005 | (STROKE DATA) |
| 2 | ADD | 192.0.0.1: 50000 | 192.0.0.2: 50001 | STROKE | p005 | (STROKE DATA) |
| 3 | UPDATE | 192.0.0.2: 50001 | 192.0.0.1: 50000 | STROKE | s006 | (50, 40) |
| 4 | UPDATE | 192.0.0.1: 50000 | 192.0.0.1: 50001 | STROKE | s006 | (50, 40) |
| 5 | DELETE | 192.0.0.2: 50001 | 192.0.0.1: 50000 | STROKE | s007 | — |
| 6 | DELETE | 192.0.0.1: 50000 | 192.0.0.1: 50001 | STROKE | s007 | — |
| 7 | ADD | 192.0.0.1: 50001 | 192.0.0.1: 50000 | PAGE | — | — |
| 8 | ADD | 192.0.0.1: 50000 | 192.0.0.2: 50001 | PAGE | — | — |
| 9 | ADD | 192.0.0.2: 50001 | 192.0.0.1: 50000 | IMAGE | p006 | aaa.jpg |
| 10 | ADD | 192.0.0.1: 50000 | 192.0.0.1: 50001 | IMAGE | p006 | aaa.jpg |
| . | . | . | . | . | . | . |

The operation data in Table 10 includes a sequence number (SEQ), the operation name of operation data, the IP address of the electronic whiteboard 2 corresponding to the sender of the operation data and the port number (PORT NO.) of its client unit (or server unit), the IP address of the electronic whiteboard 2 corresponding to the transmission destination of the operation data and the port number (PORT NO.) of its client unit (server part), the operation type of the operation data, the operation target of the operation data, and data indicating the content of the operation data that are associated with each other. For example, the operation data with the sequence number (SEQ) "1" indicates that a stroke has been drawn by the client unit 20 with the port number (PORT NO.) "50001" of the electronic whiteboard 2 with the IP address "192.0.0.1" corresponding to the host device, and the operation data has been transmitted to the server unit 90 with the port number (PORT NO.) "50000" of the same electronic whiteboard 2 (with the IP address "192.0.0.1"). In this case, the operation type is "STROKE", the operation target is page data with the page data ID "p005", and the data indicating the content of the operation data is stroke data. Also, the operation data with the sequence number (SEQ) "2" indicates that the operation data has been transmitted from the server unit 90 with the port number (PORT NO.) "50000" of the electronic whiteboard 2 with the IP address "192.0.0.1" corresponding to the host device to the client unit 20 with the port number (PORT NO.) "50001" of another electronic whiteboard 2 with the IP address "192.0.0.2".

Note that the operation synthesis process unit 84 synthesizes the operation data in the order in which the operation data is input to the operation synthesis process unit 84. As such, if the communication network 9 is not congested, the stroke image (B) is sequentially displayed on the displays 3 of all the electronic whiteboards 2 participating in the remote sharing process according to the order in which the user of each electronic whiteboard 2 has drawn a stroke or operated on a stroke.

The page process unit 85 has the same functions as the page process unit 37 of the image process unit 30 of the client unit 20. Thus, the server unit 90 also stores the page data as illustrated in Tables 1-4 in the page data storage unit 850. The page data storage unit 850 has the same contents as the page data storage unit 300 of the image process unit 30, and as such, a description thereof will be omitted.

<Functional Configuration of Recovery Process Unit>

Figure 8:
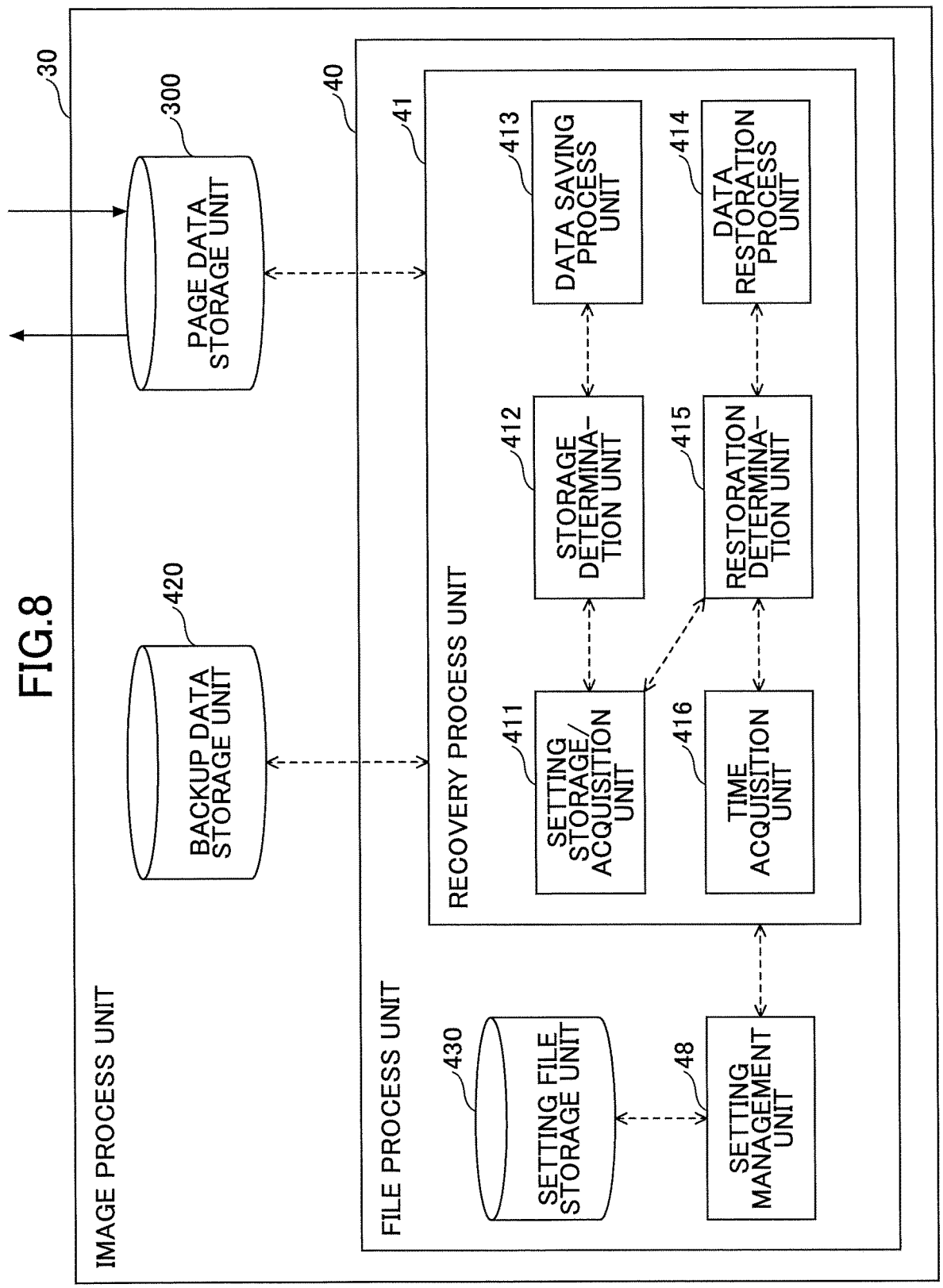
FIG. 8 is a diagram illustrating an example functional configuration of a recovery process unit.

FIG. 8 is a block diagram illustrating an example functional configuration of the recovery process unit 41. In addition to managing the various types of setting information as described above with reference to FIG. 5, the setting management unit 48 also manages setting information specifying whether display information is to be saved when the power button 119 is turned off and setting information specifying whether display information is to be restored when the power button 119 is turned on. Hereinafter, such setting information is referred to as "display information restoration setting". Note that a method for setting up the display information restoration setting will be described below with reference to FIG. 15. The display information restoration setting is described in a setting file and is stored in the setting file storage unit 430.

The recovery process unit 41 includes a setting storage/acquisition unit 411, a storage determination unit 412, a data saving process unit 413, a data restoration process unit 414, a restoration determination unit 415, and a time acquisition unit 416. The setting storage/acquisition unit 411 stores a setting file including the display information restoration setting and the time at which the power button 119 was turned off in the setting file storage unit 430 via the setting management unit 48 and acquires the setting file from the setting file storage unit 430.

The time acquisition unit 416 acquires the current time from a real time clock of the electronic whiteboard 2 or a time server, for example. The current time is used to record a power-off time and a power-on time of the power button 119. The storage determination unit 412 determines whether to save the display information. The restoration determination unit 415 determines whether to restore the saved data.

When the storage determination unit 412 determines that the display information should be saved, the data saving process unit 413 reads the display information from the page data storage unit 300 and stores the display information in the backup data storage unit 420 as saved data. When the restoration determination unit 415 determines that the saved data should be restored, the data restoration process unit 414 reads the saved data from the backup data storage unit 420 and restores the saved data.

<Process Operations>

Figure 9:
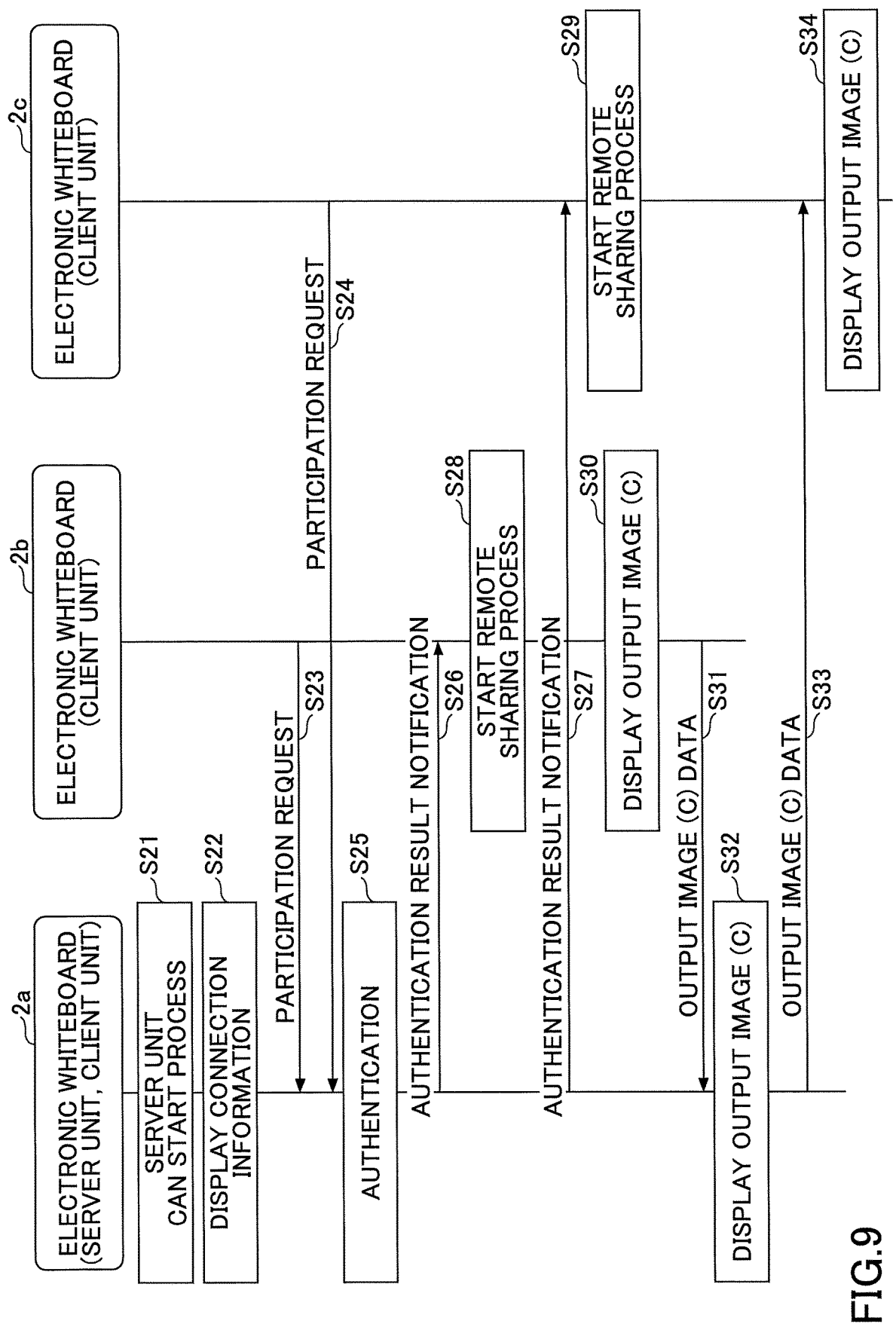
FIG. 9 is a sequence chart illustrating example process operations of a plurality of electronic whiteboards.
Figure 10:
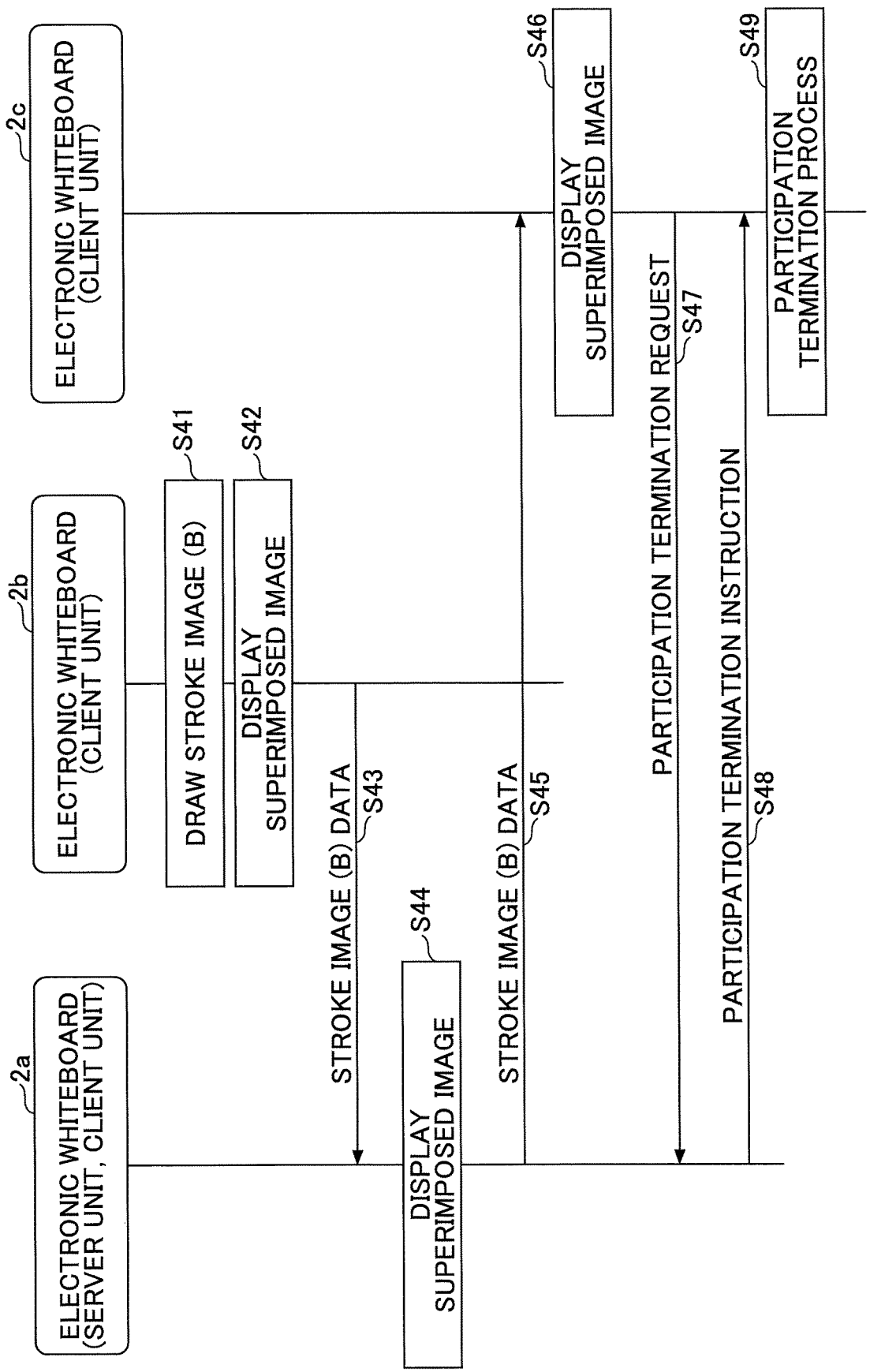
FIG. 10 is another sequence chart illustrating example process operations of the plurality of electronic whiteboards.

In the following, process operations according to the present embodiment are described with reference to FIGS. 9 and 10. FIGS. 9 and 10 are sequence charts illustrating example process operations of a plurality of electronic whiteboards 2. In the example illustrated in FIGS. 9 and 10, the electronic whiteboard 2a acts as a host device (implementing the server unit 90 and the client unit 20) that hosts a remote sharing process, and electronic whiteboards 2b and 2c act as participating devices (implementing the client unit 20) that participate in the remote sharing process. Also, in the present example, displays 3a, 3b, and 3c are respectively connected to the electronic whiteboards 2a, 2b, and 2c, and notebook PCs 6a, 6b, and 6c are respectively connected to the electronic whiteboards 2a, 2b, and 2c. Further, electronic pens 4a, 4b, and 4c are used at the electronic whiteboards 2a, 2b, and 2c, respectively.

(Participation Process)

In the following, a process for enabling the electronic whiteboards 2b and 2c to participate in the remote sharing process will be described with reference to FIG. 9.

When the user turns on the power button 119 of the electronic whiteboard 2a, the client unit 20 of the electronic whiteboard 2a is activated. Then, when the user performs an operation to activate the server unit 90 via an input device such as a touch panel, the remote start process unit 61 of the client unit 20 outputs an instruction to the remote connection request receiving unit 71 of the server unit 90 of the same electronic whiteboard 2a to start process operations of the server unit 90. In this way, not only the client unit 20 but also the server unit 90 can start various process operations in the electronic whiteboard 2a (step S21).

Then, the UI image generation unit 33 of the client unit 20 of the electronic whiteboard 2a generates connection information for establishing connection with the electronic whiteboard 2a, and the video superimposition unit 28 acquires the connection information from the UI image generation unit 33 via the display superimposition unit 36 and causes the display 3a to display the acquired connection information (step S22).

The connection information includes the IP address of the host device and a passcode generated for the remote sharing process. In this case, the remote connection process unit 81 as illustrated in FIG. 6 reads out the passcode that is stored in the passcode management unit 810 and transmits the passcode to the remote connection result transmitting unit 72, which then transmits the passcode to the remote start process unit 61. The passcode is further transmitted from the communication control unit 60 including the remote start process unit 61 to the image process unit 30 as illustrated in FIG. 4 and ultimately input to the UI image generation unit 33. In this way, the passcode is included in the connection information generated by the UI image generation unit 33. Then, the user of the electronic whiteboard 2a communicates the connection information to the users of the electronic whiteboards 2b and 2c via telephone or e-mail, for example. Note that in the case where the connection destination management table 440 is provided, the participating devices may be able to make participation requests to participate in the remote sharing process even if the IP address of the host device is not included in the connection information.

Then, when the electronic whiteboards 2b and 2c accept the connection information input thereto by operations made by their respective users, the remote participation process unit 62 of the client unit 20 of each of the electronic whiteboard 2a and 2b refers to the IP address included in the connection information to transmit a remote sharing process participation request including the passcode of the connection information to the communication control unit 70 of the server unit 90 of the electronic whiteboard 2a via the communication network 9 (steps S23 and S24). In turn, the remote connection request receiving unit 71 of the communication control unit 70 receives the remote sharing process participation request (including the passcode) from each of the electronic whiteboards 2b and 2c, and outputs the passcode to the remote connection process unit 81.

Then, the remote connection process unit 81 authenticates the passcode received from each of the electronic whiteboards 2b and 2c by referring to the passcode management unit 810 (step S25).

Then, the remote connection result transmitting unit 72 communicates the authentication result to the client unit 20 of each of the electronic whiteboards 2b and 2c (steps S26 and S27).

If it is determined in the authentication of step S25 that the electronic whiteboards 2b and 2c are legitimate electronic whiteboards, communication for implementing the remote sharing process between the electronic whiteboard 2a, as the host device, and the electronic whiteboards 2b and 2c, as participating devices, is established. As a result, the remote participation process unit 62 of the client unit 20 of each electronic whiteboard 2b and 2c starts the remote sharing process with the other electronic whiteboards (steps S28 and S29).

(Output Image Display)

In the following, a process of displaying the output image (C) in the remote sharing process will be described with reference to FIG. 9.

First, the electronic whiteboard 2b displays the output image (C) on the display 3b (step S30). Specifically, the image acquisition unit 31 of the electronic whiteboard 2b receives data of the output image (C) displayed on the notebook PC 6b from the notebook PC 6b via the video acquisition unit 21, and transmits the received data to the display 3b via the display superimposition unit 36 and the video superimposition unit 28 so that the display 3b displays the output image (C).

Then, the image process unit 30 including the image acquisition unit 31 of the electronic whiteboard 2b transmits the data of the output image (C) to the remote image transmitting unit 63, and in turn, the communication control unit 60 including the remote image transmitting unit 63 transmits the data of the output image (C) to the communication control unit 70 of the electronic whiteboard 2a acting as the host device via the communication network 9 (step S31). As a result, the remote image receiving unit 73 of the electronic whiteboard 2a receives the data of the output image (C) and outputs the received data to the remote image process unit 82, and the remote image process unit 82 stores the data of the output image (C) in the image data storage unit 830 (C).

Then, the electronic whiteboard 2a acting as the host device displays the output image (C) on the display 3a (step S32). Specifically, the remote image process unit 82 of the electronic whiteboard 2a outputs the data of the output image (C) received from the remote image receiving unit 73 to the remote image transmitting unit 74. The remote image transmitting unit 74 outputs the data of the output image (C) to the remote image receiving unit 64 of the client unit 20 of the electronic whiteboard 2a corresponding to the same host device. The remote image receiving unit 64 outputs the data of the output image (C) to the display superimposition unit 36. The display superimposition unit 36 outputs the data of the output image (C) to the video superimposition unit 28. The video superimposition unit 28 outputs the data of the output image (C) to the display 3a. As a result, the display 3a displays the output image (C).

Then, the communication control unit 70 including the remote image transmitting unit 74 of the server unit 90 of the electronic whiteboard 2a acting as the host device transmits the data of the output image (C) to the communication control unit 60 of the electronic whiteboard 2c other than the electronic whiteboard 2b via the communication network 9 (step S33). As a result, the remote image receiving unit 64 of the electronic whiteboard 2c corresponding to the other participating device receives the data of the output image (C).

Then, the electronic whiteboard 2c displays the output image (C) on the display 3c (step S34). Specifically, the remote image receiving unit 64 of the electronic whiteboard 2c outputs the data of the output image (C) received in the step S33 to the display superimposition unit 36 of the electronic whiteboard 2c. The display superimposition unit 36 outputs the data of the output image (C) to the video superimposition unit 28. The video superimposition unit 28 outputs the data of the output image (C) to the display 3c. As a result, the display 3c displays the output image (C).

Note that when data input to the display superimposition unit 36 and the video superimposition unit 28 includes not only the data of the output image (C) but also data of the UI image (A) and data of the stroke image (B), the display superimposition unit 36 generates a superimposed image (A, B, C) and the video superimposition unit 28 outputs data of superimposed image (A, B, C) to the display 3c. Also, when data of a teleconference video (E) is transmitted from the teleconference terminal 7 to the video superimposition unit 28, the video superimposition unit 28 implements a picture-in-picture process for superimposing the data of the teleconference video (E) on the superimposed image (A, B, C) and outputs the resulting image to the display 3c.

(Superimposed Image Display)

In the following, a process of displaying a superimposed image in the remote sharing process will be described with reference to FIG. 10.

First, the user of the electronic whiteboard 2b draws a stroke image (B) on the electronic whiteboard 2b using the electronic pen 4b (step S41).

Then, the display superimposition unit 36 of the electronic whiteboard 2b generates a superimposed image by layering the stroke image (B) between the UI image (A) and the output image (C) as illustrated in FIG. 7, and the video superimposition unit 28 of the electronic whiteboard 2b displays the superimposed image (A, B, C) on the display 3b of the electronic whiteboard 2b (step S42). Specifically, the stroke process unit 32 of the electronic whiteboard 2b receives the data of the stroke image (B) as operation data from the coordinate detection unit 22 and the contact detection unit 24 via the event sorting unit 25, and transmits the received data to the display superimposition unit 36. In this way, the display superimposition unit 36 can place the stroke image (B) between the UI image (A) and the output image (C) to generate a superimposed image, and the video superimposition unit 28 can display the superimposed image (A, B, C) on the display 3b of the electronic whiteboard 2b.

Then, the image process unit 30 including the stroke process unit 32 of the electronic whiteboard 2b transmits the data of the stroke image (B) to the remote operation transmitting unit 65. The remote operation transmitting unit 65 of the electronic whiteboard 2b transmits the data of the stroke image (B) to the communication control unit 70 of the electronic whiteboard 2a acting as the host device via the communication network 9 (step S43).

As a result, the remote operation receiving unit 75 of the electronic whiteboard 2a receives the data of the stroke image (B) and outputs the received data to the remote operation process unit 83. The remote operation process unit 83 outputs the data of the stroke image (B) to the operation synthesis process unit 84. In this way, each time a stroke image (B) is drawn at the electronic whiteboard 2b, the data of the stroke image (B) drawn at the electronic whiteboard 2b is transmitted to the remote operation process unit 83 of the electronic whiteboard 2a acting as the host device. Note that data of a stroke image (B) corresponds to data identified by a stroke data ID in Table 2. Thus, for example, when the user draws the alphabet "T" with the electronic pen 4 as described above, because the alphabet "T" is written in two strokes, data of stroke images (B) identified by two stroke data IDs are sequentially transmitted to the remote operation process unit 83 of the electronic whiteboard 2a.

Then, the electronic whiteboard 2a acting as the host device displays on the display 3a a superimposed image (A, B, C) including data of the stroke image (B) received from the electronic whiteboard 2b (step S44). Specifically, the operation synthesis process unit 84 of the electronic whiteboard 2a synthesizes the data of the plurality of stroke images (B) sequentially received via the remote operation process unit 83, stores the synthesized data to the operation data storage unit 840, and supplies the synthesized data to the remote operation process unit 83 at the same time. As a result, the remote operation process unit 83 outputs the synthesized data of the stroke images (B) received from the operation synthesis process unit 84 to the remote operation transmitting unit 76. The remote operation transmitting unit 76 outputs the synthesized data of the stroke images (B) to the remote operation receiving unit 66 of the client unit 20 of the electronic whiteboard 2a. The remote operation receiving unit 66 outputs the synthesized data of the stroke images (B) to the display superimposition unit 36 of the image process unit 30. Then, the display superimposition unit 36 places the synthesized stroke image (B) between the UI image (A) and the output image (C) to generate a superimposed image (A, B, C). Then, the video superimposition unit 28 displays the superimposed image (A, B, C) generated by the display superimposition unit 36 on the display 3a.

Then, the communication control unit 70 including the remote operation transmitting unit 76 of the server unit 90 of the electronic whiteboard 2a acting as the host device transmits, via the communication network 9, the synthesized data of the stroke images (B) to the communication control unit 60 of the electronic whiteboard 2c corresponding to the participating device other than the electronic whiteboard 2b that is the sender of the synthesized data of the stroke images (B) (step S45). As a result, the remote operation receiving unit 66 of the electronic whiteboard 2c acting as the participating device receives the synthesized data of the stroke images (B).

Then, the electronic whiteboard 2c displays a superimposed image (A, B, C) on the display 3c (step S46). Specifically, the remote operation receiving unit 66 of the electronic whiteboard 2c outputs the synthesized data of the stroke images (B) received in the step S45 to the image process unit 30 of the electronic whiteboard 2c. The display superimposition unit 36 of the image process unit 30 places the synthesized data of the stroke images (B) between the data of the UI image (A) and the output image (C) to generate a superimposed image (A, B, C) and outputs data of the superimposed image (A, B, C) to the video superimposition unit 28. The video superimposition unit 28 outputs the data of the superimposed image (A, B, C) to the display 3c. As a result, the display 3c displays the superimposed image (A, B, C).

Note that although the output image (C) is displayed on the display 3 in the above-described processes, in other examples, the background image (D) may be displayed instead of this output image (C). Alternatively, both the output image (C) and the background image (D) may be displayed on the display 3 at the same time, for example.

(Participation Termination)

In the following, a process in which a participating device terminates participation in the remote sharing process will be described with reference to FIG. 10. In FIG. 10, an example process in which the electronic whiteboard 2c terminates participation in the remote sharing process is illustrated.

First, when the electronic whiteboard 2c accepts a user operation making a request to terminate participation in the remote sharing process, the remote participation process unit 62 of the electronic whiteboard 2c transmits a participation termination request to the communication control unit 70 of the server unit 90 of the electronic whiteboard 2a acting as the host device (step S47). As a result, the remote connection request receiving unit 71 of the communication control unit 70 receives the participation termination request from the electronic whiteboard 2c and outputs the participation termination request together with the IP address of the electronic whiteboard 2c to the remote connection process unit 81. Then, the remote connection process unit 81 of the electronic whiteboard 2a deletes the IP address of the electronic whiteboard 2c and the name of the installation location of the electronic whiteboard 2c from the participating location management table 820 and outputs a notification indicating the IP address of the electronic whiteboard 2c and the fact that the IP address of the electronic whiteboard 2c has been deleted to the connection result transmitting unit 72.

Then, the communication control unit 70 including the remote connection result transmitting unit 72 transmits a participation termination instruction to the communication control unit 60 of the client unit 20 of the electronic whiteboard 2c via the communication network 9 (step S48). As a result, the remote participation process unit 62 of the communication control unit 60 of the electronic whiteboard 2c disconnects the communication for the remote sharing process to end participation in the remote sharing process (step S49).

First Example Embodiment

To explain power button related processes, an example operation of saving display information in response to the user performing appropriate operations on the electronic whiteboard 2 to save the display information and an example normal termination operation of the electronic whiteboard 2 will be described below. The electronic whiteboard 2 saves backup data in response to an operation of saving display information, and in normal termination, the electronic whiteboard 2 saves the backup data before termination.

Figure 11:
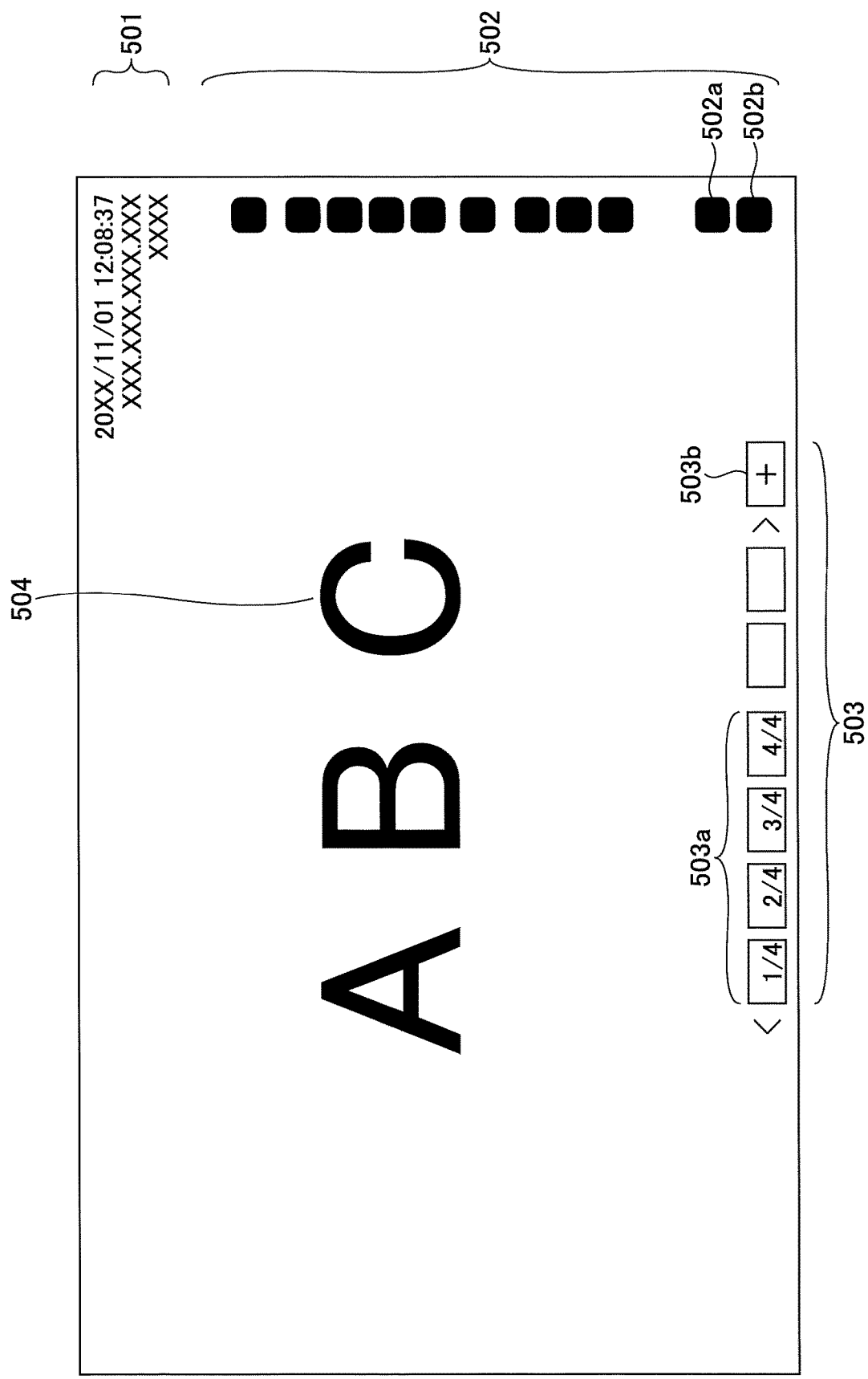
FIG. 11 is a diagram illustrating examples of a user interface image and a stroke image of the electronic whiteboard.

FIG. 11 is a diagram illustrating examples of the UI image (A) and the stroke image (B) of the electronic whiteboard 2. The UI image (A) includes an information display area 501, a main operation panel 502, and a page operation panel 503. The information display area 501 displays information, such as the date/time, the host name of the electronic whiteboard 2 (not displayed if not set), the IP address of the electronic whiteboard 2, and the passcode for a conference, for example. The passcode is communicated to users at other locations when electronic whiteboards 2 installed at these other locations are to participate in the conference.

The main operation panel 502 displays icons for enabling the user to perform various operations such as writing and editing. Note that icons related to the present embodiment will be described below for convenience of explanation. The page operation panel 503 displays icons including a thumbnail 503a of each page, and a new page creation icon 503b, for example.

A read/save icon 502a may be included as one of the icons of the main operation panel 502. By pressing the read/save icon 502a with a finger or the electronic pen 4, the user may be able to perform various operations, such as reading a file (various files, including a PDF file), saving a page, sending mail, and printing a page, for example. By saving a page, display information may be stored in the backup data storage unit 420. When saving a PDF file, the user may be able to perform further operations, such as assigning a file name, and specifying a conference ID and a password, for example. In FIG. 11, a stroke image 504 and page data (thumbnails 503a) correspond to display information.

A termination icon 502b may be included as another one of the icons of the main operation panel 502. The termination icon 502b is pressed to cause the electronic whiteboard 2 to undergo normal termination. When the termination icon 502b is pressed, the electronic whiteboard 2 displays a dialog for saving the display information displayed on the display 3. Thus, upon operating the electronic whiteboard 2 to undergo normal termination, the user can save the display information as necessary.

Note that the electronic whiteboard 2 that has been operated to undergo normal termination as described above may transition to a shutdown state or standby mode, for example. In the case where the electronic whiteboard 2 transitions to standby mode, the electronic whiteboard 2 may stop operating when an idle time of the electronic whiteboard 2 after transitioning to standby mode exceeds a predetermined value (standby time in FIG. 15), for example. Irrespective of whether the electronic whiteboard 2 immediately shuts down or stops operating after transitioning to standby mode, display information is stored in the backup data storage unit 420.

As described above, when the user saves the display information or when the user operates the electronic whiteboard 2 to undergo normal termination, the display information can be saved in a PDF file as backup data. However, when the user turns off the power button 119, all or a part of the display information stored in the page data storage unit 300 may not be saved in the backup data storage unit 420.

In the present embodiment, even when the user turns off the power button 119, the display information can be stored in the backup data storage unit 420 and restored when the power is turned on.

<Operation Procedure>

Figure 12A:
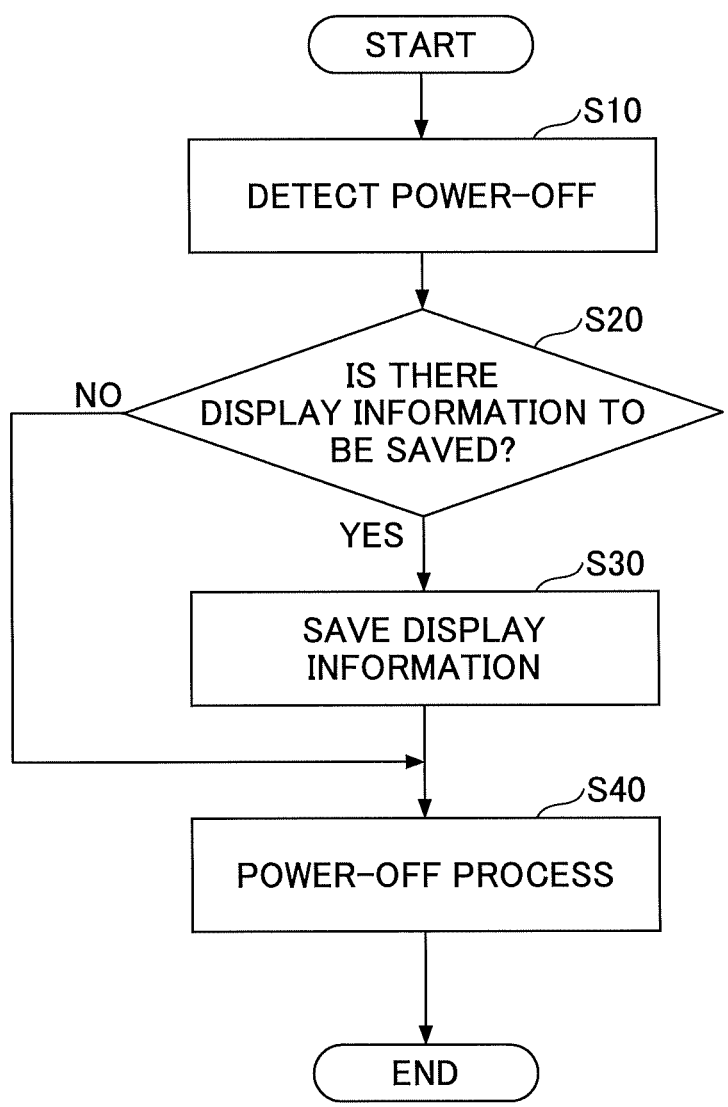
FIG. 12A is a flowchart illustrating a first example process performed by the electronic whiteboard when a power button of the electronic whiteboard or a remote power button is turned off.

FIG. 12A is a flowchart illustrating an example process performed by the electronic whiteboard 2 when the power button 119 or the remote power button 11a of the electronic whiteboard 2 is turned off.

When the user turns off the power button 119 or the remote power button 11a of the remote control device 11, the power button monitoring unit 52 detects a power-off operation of the power button 119 or the remote power button 11a (step S10). In turn, the power button monitoring unit 52 transmits a power-off request to the file process unit 40.

The storage determination unit 412 of the recovery process unit 41 of the file process unit 40 that receives the power-off request determines whether there is data to be saved (step S20). The data to be saved is display information. While the electronic whiteboard 2 is active, data as illustrated in Tables 1 to 3 and media data as illustrated in Table 4 are held in the page data storage unit 300. Thus, if page data or media data are stored in the page data storage unit 300, there is data (display information) to be saved.

If a negative determination (NO) is made in step S20, the process proceeds to step S40. If a positive determination (YES) is made in step S20, the data saving process unit 413 of the recovery process unit 41 reads the display information from the page data storage unit 300 and stores the display information in the backup data storage unit 420 (step S30). That is, images of one or more pages are saved as one PDF file. Upon saving the display information as a PDF file, the data saving process unit 413 stores a flag "F" in association with the PDF file.

Note that other information, such as operation history information and buffer information obtained by a cutting or copying operation and stored in a clipboard, may also be saved in addition to the display information, for example. The clipboard may be implemented by the RAM 103 or the SSD 104, for example.

Then, the power button monitoring unit 52 acquires a saving completion notification from the file process unit 40 and requests the termination process unit 53 to perform a termination process. That is, the termination process unit 53 performs processes, such as saving the data stored in the RAM 103 to the SSD 104 of the electronic whiteboard 2, and initializing the page data storage unit 300, for example. Thereafter, operation of the electronic whiteboard 2 is stopped.

As described above, even if the power button 119 or the remote power button 11a is turned off, display information can still be saved in the present embodiment.

Figure 12B:
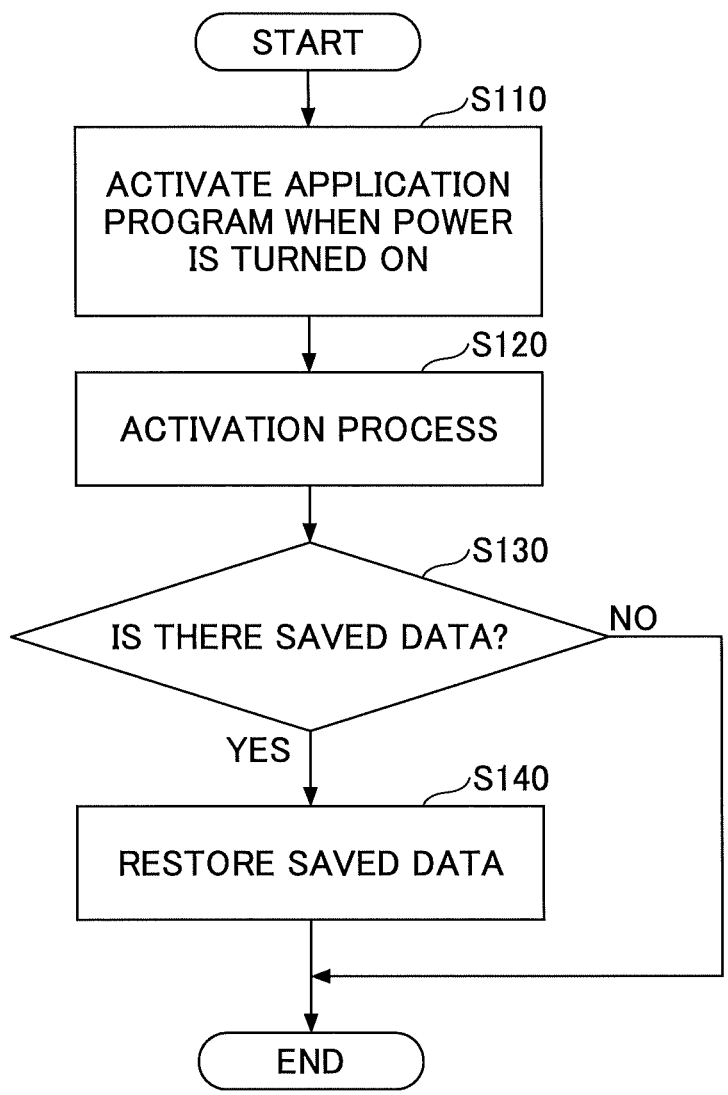

FIG. 12B is a flowchart illustrating an example process performed by the electronic whiteboard 2 when the power button 119 or the remote power button 11a of the electronic whiteboard 2 is turned on.

First, when the power button 119 or the remote power button 11a is turned on, the OS and the application program of the electronic whiteboard 2 are activated (step S110).

When the application program is activated, the activation process unit 54 performs an activation process (step S120). That is, the activation process unit 54 may implement various processes, such data recovery by the recovery process unit 41, initialization of the page data storage unit 300, user authentication, and passcode generation, for example.

Then, the restoration determination unit 415 of the recovery process unit 41 determines whether there is saved data stored in the backup data storage unit 420 (step S130). That is, the restoration determination unit 415 determines whether backup data with a flag "F" is stored in the backup data storage unit 420.

If a negative determination (NO) is made in step S130, the process of FIG. 12B is ended. If a positive determination (YES) is made in step S130, the data restoration process unit 414 of the recovery process unit 41 restores the saved data and displays the saved data on the display 3. For example, the first page or the last page of the saved data may be displayed on the display 3. Alternatively, the page that was last displayed on the display 3 may be redisplayed, for example. Note that restoration may refer to interpretation of a PDF file, but if data is encrypted, restoration may also include a process of decrypting the data, for example.

As described above, when the power button 119 or the remote power button 11a is turned off, the electronic whiteboard 2 can save display information and restore the display information when the power button 119 or the remote power button 11a is turned on. Thus, for example, when the user turns off the power button 119 by an erroneous operation, the display information will not be lost and the display information can be redisplayed on the display 3.

Second Example Embodiment

In the above-described first example embodiment, if there is saved data, the saved data is always restored. However, when a user that does not wish to have the saved data restored turns on the power of the electronic whiteboard 2, unnecessary restoration operations will be performed. In this respect, the electronic whiteboard 2 according to a second example embodiment enables the user to control whether to restore saved data.

Figure 13:
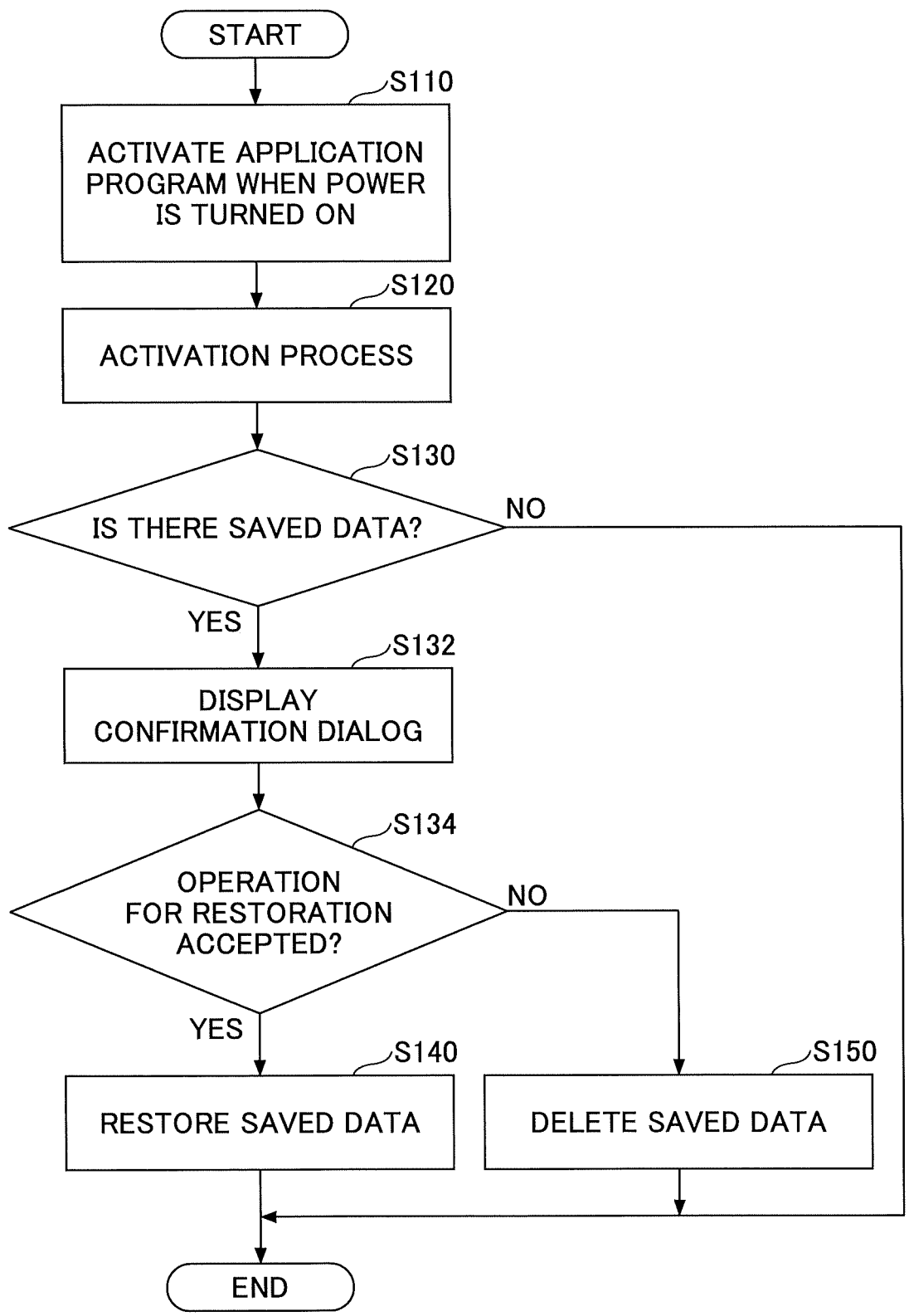

FIG. 13 is a flowchart illustrating an example process performed by the electronic whiteboard 2 when the power button 119 or the remote power button 11a of the electronic whiteboard 2 is turned on. Note that a power-off process that is performed when the power button 119 or the remote power button 11a is turned off in the present example embodiment may be substantially identical to the power-off process performed in the above-described first example embodiment. In the following, process operations of FIG. 13 that differ from those of FIG. 12B are mainly described.

In FIG. 13, when there is saved data (YES in step S130), the storage determination unit 412 of the recovery process unit 41 displays a confirmation dialog on the display 3 (step S132). FIG. 14 illustrates an example of the confirmation dialog. As illustrated in FIG. 14, the confirmation dialog enables the user to select whether to restore display information.

Then, the storage determination unit 412 determines whether the operation process unit 26 has accepted an operation for restoring the saved data (step S134).

If a positive determination (YES) is made in step S134, the data restoration process unit 414 restores the saved data (step S140). Thus, as in the above-described first example embodiment, when the user turns the power off by an erroneous operation, for example, the display information will not be lost and the display information can be redisplayed on the display 3.

If a negative determination (NO) is made in step S134, the data restoration process unit 414 deletes the saved data (step S150). Because the saved data can be deleted when the power button 119 or the remote power button 11a is turned on, the display information may be prevented from being viewed by another user and information leakage may be prevented, for example.

FIG. 14 illustrates an example confirmation dialog 511 displayed on the display 3. The confirmation dialog 511 includes a message 512 indicating "Restore last handwritten data etc.?", a "restore" button 513, and a "start new whiteboard" button 514. The "restore" button 513 is for restoring saved data, and the "start new whiteboard" button 514 is for causing the page data storage unit 300 to start storing new page data and the like without restoring the saved data.

When the user presses the "restore" button 513 or the "start new whiteboard" button 514, the coordinate detection unit 22 detects the coordinates of the position touched by the user. The event sorting unit 25 determines that a UI operation has been input based on the detected coordinates and information that the confirmation dialog 511 is being displayed and outputs the detected coordinates to the operation process unit 26. The operation process unit 26 transmits the operation content of the UI operation to the storage determination unit 412 of the recovery process unit 41.

Thus, the storage determination unit 412 can determine whether the user has pressed the "restore" button 513 or the "start new whiteboard" button 514.

As described above, the electronic whiteboard 2 according to the present example embodiment can prevent execution of unnecessary restoration operation when a user that does not wish to have saved data restored turns on the power of the electronic whiteboard 2. Note that the present example embodiment can be implemented in combination with other example embodiments as described below, for example.

Third Example Embodiment

In the above-described first and second example embodiments, when saved data is restored, display information may be viewed by a third party, and as such, there is a risk of information leakage. In this respect, the electronic whiteboard 2 according to a third example embodiment enables a user or the like to specify settings on whether to save display information when the power button 119 or the remote power button 11a is turned off.

FIG. 15 is a diagram illustrating an example setting screen 601 displayed on the display 3. The setting screen 601 includes a location name change button 602, a system update setting field 603, an automatic shutdown time setting field 604, an automatic restart time setting field 605, an automatic standby time setting field 606, a remote conference image quality setting field 607, a temporary storage setting field 608, a grid/guide line setting field 609, a default value setting field 620, and a display information restoration setting field 612.

The location name change button 602 is a button for changing the location name of the electronic whiteboard 2. The system update setting field 603 is a field for setting the system (firmware) update timing. The automatic shutdown time setting field 604 is a field for setting the time period over which the electronic whiteboard 2 is to remain idle before being automatically shut down. The automatic restart time setting field 605 is a field for setting the time at which the electronic whiteboard 2 is to be automatically activated. The automatic standby time setting field 606 is a field for setting the time period over which the electronic whiteboard 2 is to remain ide before being automatically switched to standby mode. The image quality setting field 607 is a field for setting the image quality of images to be exchanged with an electronic whiteboard 2 at another location. The temporary storage setting field 608 is a field for setting automatic backup settings. The grid/guide line setting field 609 is a field for setting the density of grid/guide lines. The default value setting field 620 is a field for setting on/off detailed setting default values of the electronic whiteboard 2.

The display information restoration setting field 612 is a field for specifying settings for power button related processes. The display information restoration setting field 612 includes a message 612a indicating "Restore whiteboard from last shutdown upon activation" and a checkbox 612b. When the checkbox 612b is checked (set on), the power button related processes are enabled.

The display information restoration setting field 612 also includes a restoration timeout time setting field 612c. The restoration timeout time setting field 612c is a field for setting the maximum time period that can elapse from the power-off time of the power button 119 or the remote power button 11a and still enable restoration of the saved data (referred to as restoration timeout time). Note that the user may choose not to set up a restoration timeout time, and in such case, "– (not set)" can be selected as the setting for the restoration timeout time setting field 612c, for example.

When the user presses an "OK" button 613, the settings set up by the user via the setting screen 601 of FIG. 15 are stored as a setting file in the setting file storage unit 430. When a "CANCEL" button 614 is pressed, the settings are not stored. Specifically, the coordinate detection unit 22 detects the coordinates of the position touched by the user, and the event sorting unit 25 determines that a UI operation has been input based on the detected coordinates and information that the setting screen 601 is being displayed and outputs the detected coordinates to the operation process unit 26. The operation process unit 26 transmits the operation content to the setting management unit 48. The setting management unit 48 stores the setting file in the setting file storage unit 430. The setting storage/acquisition unit 411 of the recovery process unit 41 acquires the setting file via the setting management unit 48.

Note that the setting screen 601 may be displayed by a PC that is connected to the electronic whiteboard 2 via the communication network 9, for example. The PC may display the setting screen 601 using browser software, for example, and the user may operate the PC to set up settings in the setting screen 601.

Figure 16A:
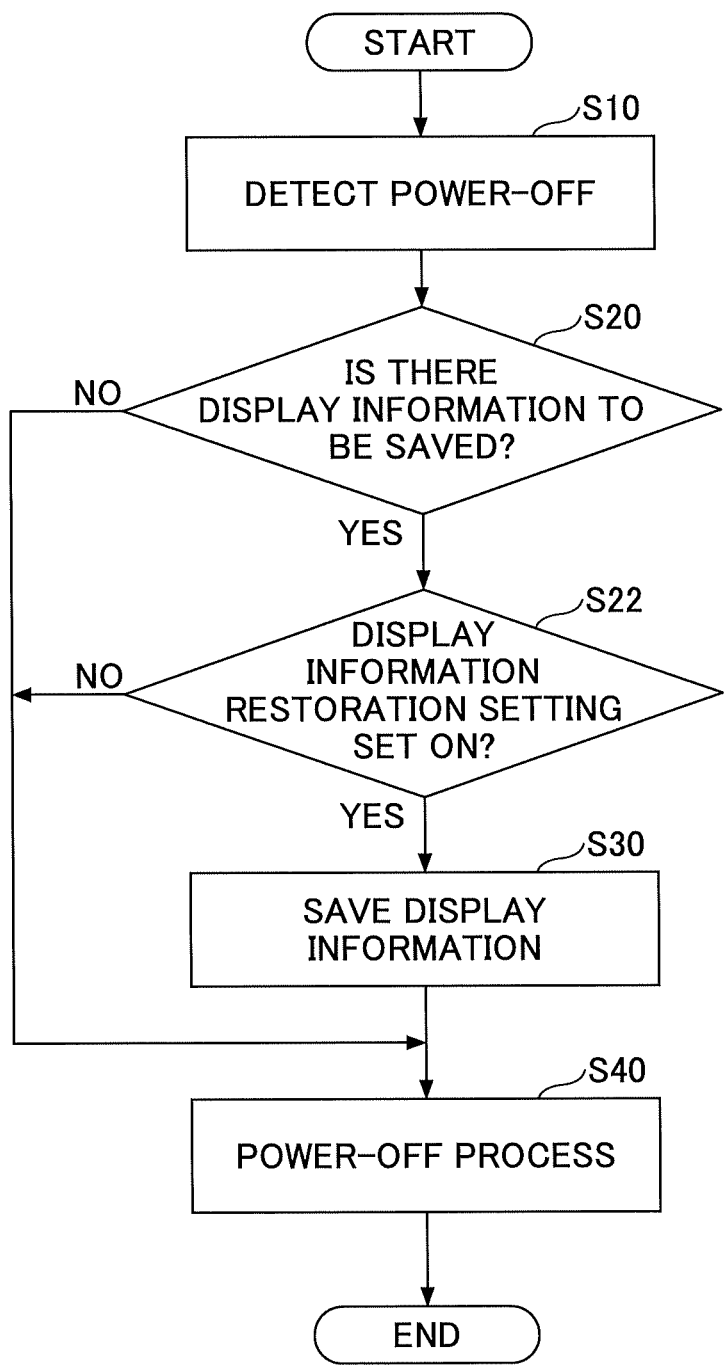
FIG. 16A is a flowchart illustrating a third example process performed by the electronic whiteboard when the power button of the electronic whiteboard or the remote power button is turned off.

FIG. 16A is a flowchart illustrating an example process performed by the electronic whiteboard 2 when the power button 119 or the remote power button 11a of the electronic whiteboard 2 is turned off. Note that process operations of FIG. 16A that differ from those of FIG. 12A will be mainly described below. The process according to the present example embodiment as described below relates to a case where the restoration timeout time is not set up.

When there is data to be saved (YES in step S20), the storage determination unit 412 of the recovery process unit 41 determines whether the display information restoration setting is set on (step S22). That is, the storage determination unit 412 may acquire the setting file via the setting management unit 48 and determines whether the display information restoration setting is set on, for example. The storage determination unit 412 may alternatively make an inquiry to the setting management unit 48 on whether the display information restoration setting is set on, for example.

If a positive determination (YES) is made in step S22, the data saving process unit 413 stores the display information (step S30). If a negative determination (NO) is made in step S22, the data saving process unit 413 does not save the display information, and the termination process unit 53 executes a termination process (step S40).

As can be appreciated, when the display information restoration setting is set off, display information is not saved, and in this way, the risk of the display information being viewed by a third party can be reduced.

Figure 16B:
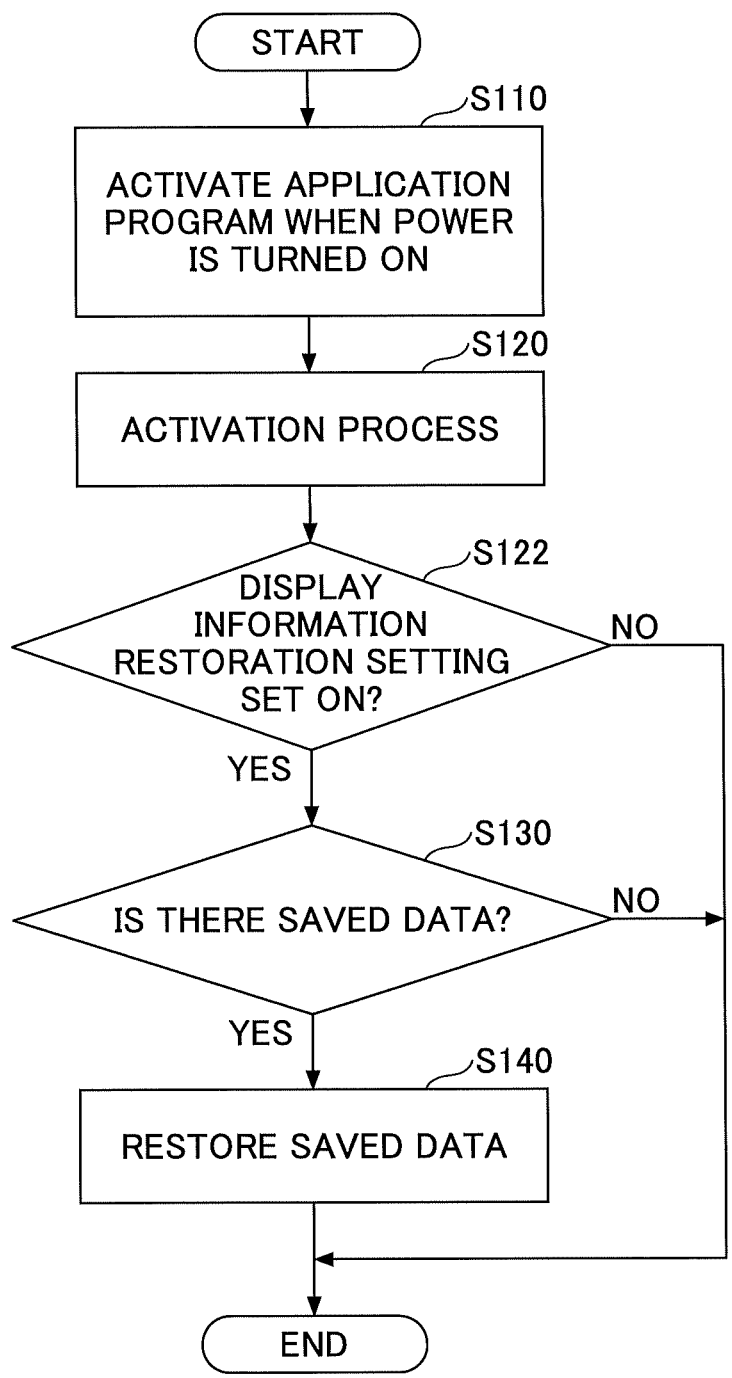

FIG. 16B is a flowchart illustrating an example process performed by the electronic whiteboard 2 when the power button 119 or the remote power button 11a of the electronic whiteboard 2 is turned on. Note that process operations of FIG. 16B that differ from those of FIG. 12B will mainly be described below. The process according to the present example embodiment relates to a case where the restoration timeout time is not set up.

When the application program of the electronic whiteboard 2 is activated, the restoration determination unit 415 of the recovery process unit 41 determines whether the display information restoration setting is set on (step S122).

Then, only when a positive determination (YES) is made in step S122, the restoration determination unit 415 determines whether there is saved data (step S130), and the data restoration process unit 414 restores the saved data (step S140).

As can be appreciated, when the display information restoration setting is set off, display information is not restored, and in this way, the risk of the display information being viewed by a third party can be reduced.

As described above, in the electronic whiteboard 2 according to the present example embodiment, the user can set up the display information restoration setting to specify whether to restore saved data, and in this way, security may be improved. For example, in the case where the user that turns off the power button 119 or the remote power button 11a and the user that turns on the power button 119 or the remote power button 11a are the same person, the display information restoration setting may always be set on (as in the first and second example embodiments). However, in some cases, after user A turns off the power button 119 or the remote power button 11a, user B may turn on the power button 119 or the remote power button 11a, for example. If user A and user B belong to different companies, different departments or the like, for example, allowing user B to view the display information displayed during use by user A may constitute information leakage. That is, in a situation where unspecified users can use the electronic whiteboard 2, information leakage may be readily prevented by setting off the display information restoration setting, for example.

Note that the present example embodiment can be modified as necessary and implemented in combination with other embodiments, for example.

Fourth Example Embodiment

In the electronic whiteboard 2 according to a fourth example embodiment as described below, the display information restoration setting is set on and the restoration timeout time is set up.

In some cases, it may be beneficial for a user to set up the restoration timeout time as described below. Although the display information restoration setting may desirably be set on in order to appropriately respond to erroneous operation of the power button 119 or the remote power button 11a, for example, a user may still wish to impose some restriction on the restoration of saved data. In general, a user that turns off the power button 119 or the remote power button 11a through erroneous operation would presumably turn on the power button 119 or the remote power button 11a immediately thereafter. As such, by setting up the restoration timeout time to a short period of time (e.g., several minutes), saved data can be restored while preventing information leakage. That is, when a power-off operation and a power-on operation of the power button 119 or the remote power button 11a occur within a short period of time, the power-off operation immediately preceding the power-on operation may be presumed to be an erroneous operation. Also, when a power-off operation and a power-on operation of the power button 119 or the remote power button 11a occur within a short period of time, the user that has turned off the power button 119 or the remote power button 11a and the user that has turned on the power button 119 or the remote power button 11a may be presumed to be the same person (or different persons with whom the display information can be shared).

On the other hand, the electronic whiteboard 2 will not restore saved data in a case where a substantial period of time has elapsed from the last power-off operation to the extent that a different conference could be started or the user of the electronic whiteboard 2 could have changed, for example. Thus, by setting up the restoration timeout time to an appropriate time period, loss of display information may be prevented and information leakage may be prevented.

Figure 17A:
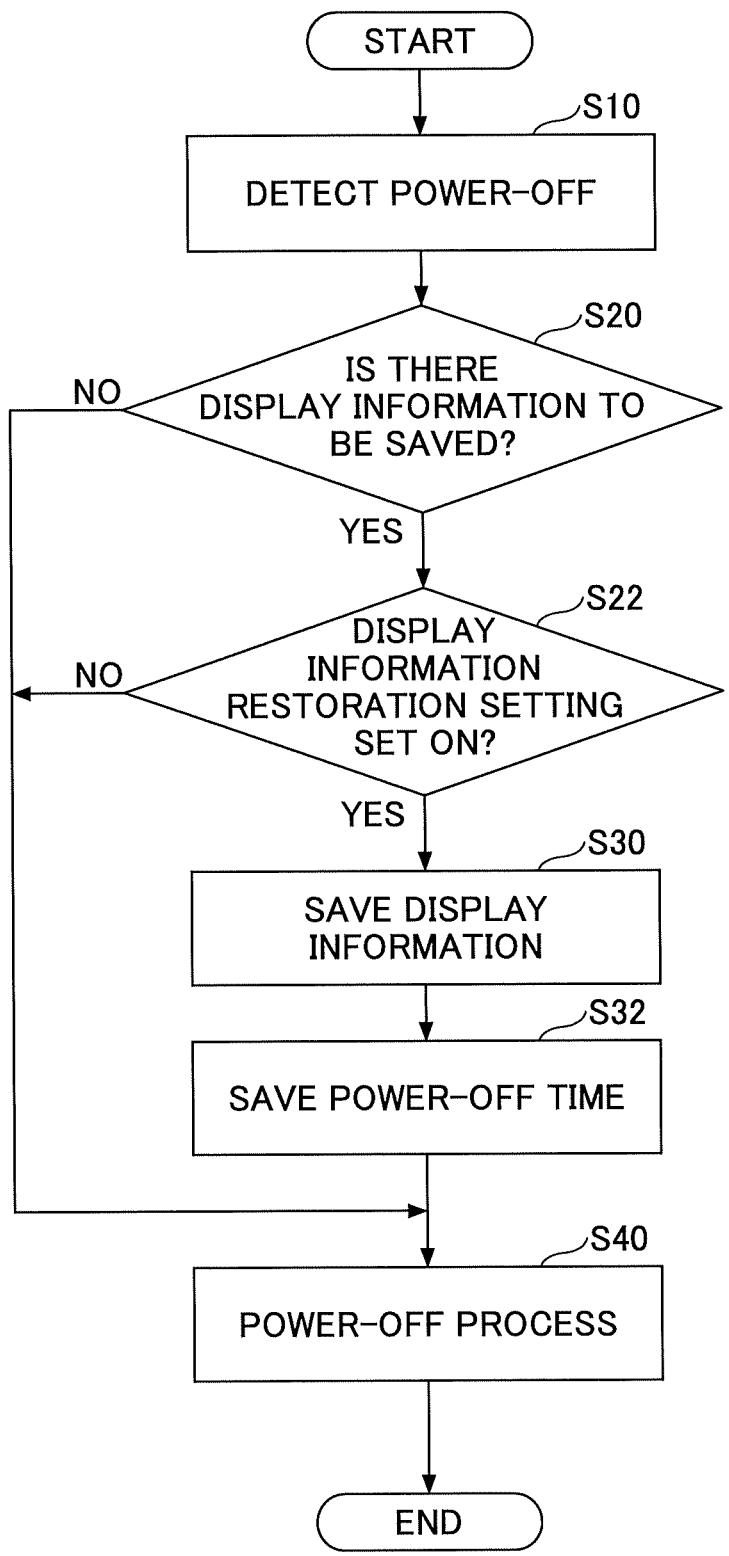
FIG. 17A is a flowchart illustrating a fourth example process performed by the electronic whiteboard when the power button of the electronic whiteboard or the remote power button is turned off.

FIG. 17A is a flowchart illustrating an example process performed by the electronic whiteboard 2 when the power button 119 or the remote power button 11a of the electronic whiteboard 2 is turned off. Note that process operation of FIG. 17A that differ from those of FIG. 16A are mainly described below.

When display information is saved in step S30, the time acquisition unit 416 stores the time at which the power button 119 or the remote power button 11a was turned off in association with the saved data in the backup data storage unit 420 (step S32). That is, the current time is acquired from a real time clock or a time server, for example, and is stored in association with the saved data. Note that in a case where the time at which the power button 119 or the remote power button 11a was turned off is included in the file name of the saved data, step S32 may be omitted, for example. Also, the time at which the power button 119 or the remote power button 11a was turned off that is stored in association with the saved data need not be the exact time as long as it is not substantially different from the time at which the power button 119 or the remote power button 11a was turned off. For example, the time at which the saved data was saved or the time at which a power-off request was acquired may be stored as the time at which the power button 119 or the remote power button 11a was turned off. Note that a power-off process performed in step S40 of FIG. 17A may be substantially identical to the power-off process performed in step S40 of FIG. 16A.

Figure 17B:
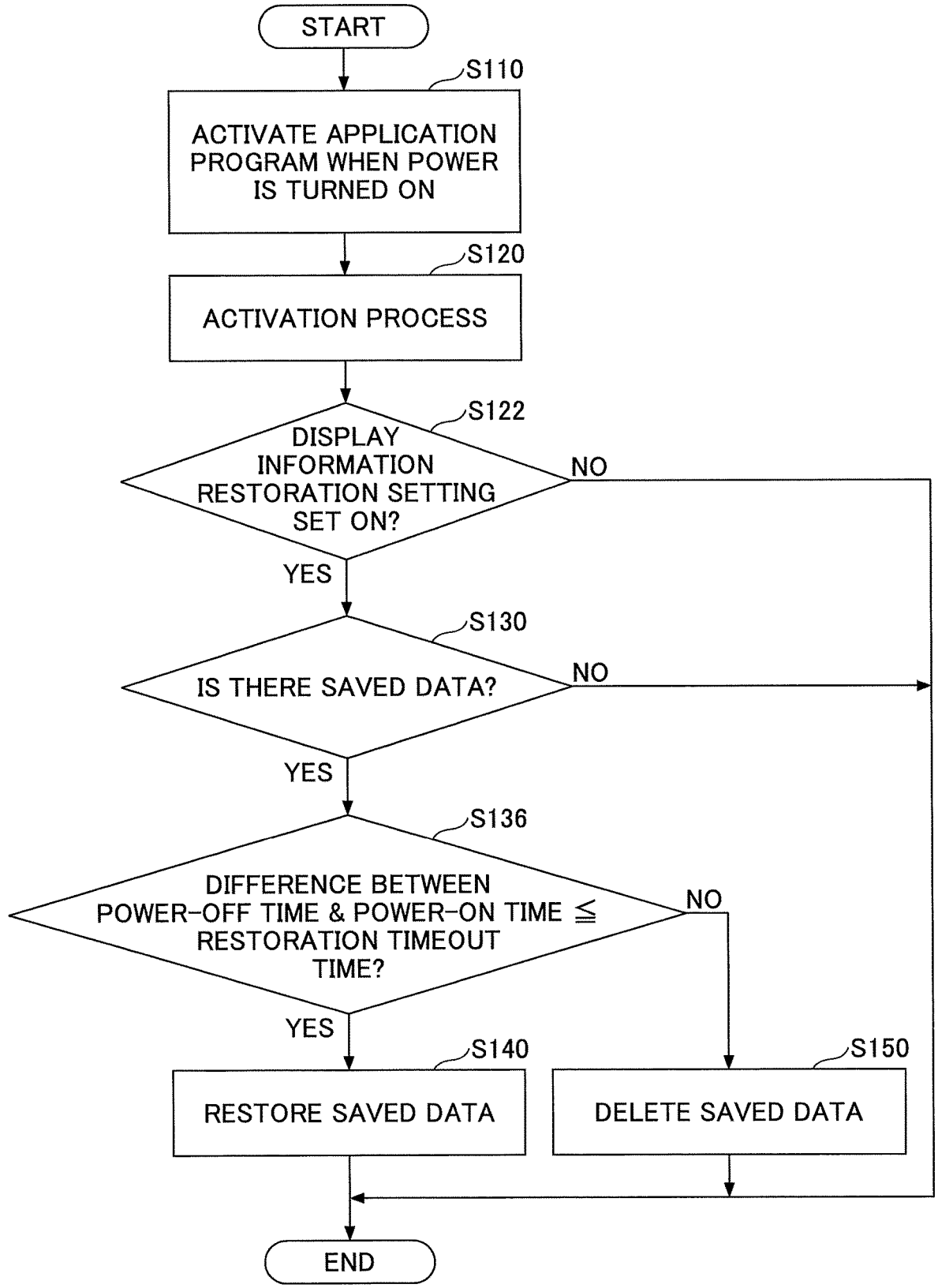

FIG. 17B is a flowchart illustrating an example process performed by the electronic whiteboard 2 when the power button 119 or the remote power button 11a of the electronic whiteboard 2 is turned on. Note that process operations of FIG. 17B that differ from those of FIG. 16B will be mainly described below.

In FIG. 17B, when it is determined in step S130 that there is saved data, the restoration determination unit 415 determines whether the difference between a power-off time and a power-on time is less than or equal to the restoration timeout time (step S136). That is, the restoration determination unit 415 refers to the operation history of the power button 119 or the remote power button 11a. The power-on time may be the current time acquired by the time acquisition unit 416 in step S136, for example. Alternatively, the power-on time may be the time acquired by the time acquisition unit 416 between the start of the process of FIG. 17B and the execution of the process of step S136, for example.

If a positive determination (YES) is made in step S136, the data restoration process unit 414 restores the saved data (step S140). That is, when the display information restoration setting is set on and the difference between the power-off time and the power-on time is less than or equal to the restoration timeout time, the data restoration process unit 414 restores the saved data.

If a negative determination (NO) is made in step S136, the data restoration process unit 414 deletes the saved data (step S150). That is, even if the display information restoration setting is set on, if the difference between the power-off time and the power-on time is not less than or equal to the restoration timeout time, the saved data is deleted.

As described above, the electronic whiteboard 2 can appropriately determine whether to display saved data. That is, when it can be presumed that a power-off operation of the power button 119 or the remote power button 11a was an erroneous operation, or when it can be presumed that the user that has turned off the power button 119 or the remote power button 11a and the user that has turned on the power button 119 or the remote power button 11a are the same person, saved data can be restored. On the other hand, when it can be presumed, based on the elapsed time from the power-off time, that a different conference has been started or the user of the electronic whiteboard 2 has changed, for example, the electronic whiteboard 2 does not restore the saved data so that information leakage may be prevented.

Note that the present example embodiment may be modified as necessary and implemented in combination with other embodiments, for example.

Fifth Example Embodiment

The electronic whiteboard 2 according to a fifth example embodiment is capable of saving a passcode together with the saved data. As described above with reference to steps S23 and S24 of FIG. 9, an electronic whiteboard 2 corresponding to a participating device uses a passcode to log in to the electronic whiteboard 2 corresponding to the host device. The passcode may be a fixed passcode or it may be automatically generated each time the electronic whiteboard 2 corresponding to the host device is reactivated, for example. In the latter case, when the power button 119 or the remote power button 11a is turned off and then turned on, the electronic whiteboard 2 may be reactivated and thereby generate a new passcode. In this case, the user of the reactivated electronic whiteboard 2 has to communicate the new passcode to one or more other users that are remotely located.

In this respect, the electronic whiteboard 2 according to the present example embodiment saves the passcode generated before the power has been turned off so that the user of the electronic whiteboard 2 would not have to communicate the password to the other users once again.

Figure 18A:
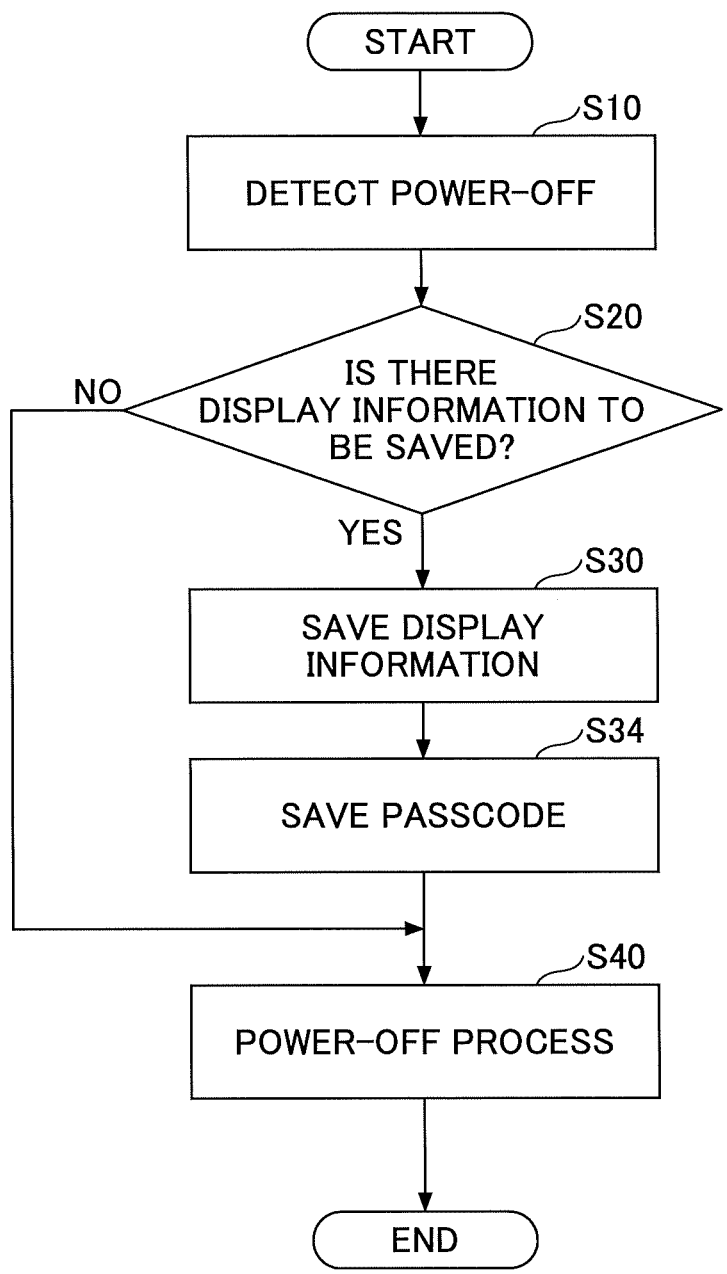
FIG. 18A is a flowchart illustrating a fifth example process performed by the electronic whiteboard when the power button of the electronic whiteboard or the remote power button is turned off.

FIG. 18A is a flowchart illustrating an example process performed by the electronic whiteboard 2 when the power button 119 or the remote power button 11a of the electronic whiteboard 2 is turned off. Note that process operations of FIG. 18A that differ from those of FIG. 12A are mainly described below.

When the data saving process unit 413 saves display information as saved data (step S30), the data saving process unit 413 saves the passcode in association with the saved data in the backup data storage unit 420 (step S34). In this way, the electronic whiteboard 2 can read out the passcode together with the saved data from the backup data storage unit 420. Note that subsequent process operations of FIG. 18A may be substantially identical to those of FIG. 12A.

FIG. 18B is a flowchart illustrating an example process performed by the electronic whiteboard 2 when the power button 119 or the remote power button 11a of the electronic whiteboard 2 is turned on. Note the process operations of FIG. 18B that differ from those of FIG. 12B are mainly described below.

When the data restoration process unit 414 restores saved data (step S140), the data restoration process unit 414 reads the passcode stored in association with the saved data from the backup data storage unit 420 (step S142). Because the passcode is managed by the passcode management unit 810, the data restoration process unit 414 transmits the passcode to the passcode management unit 810. In this way, the passcode management unit 810 can manage the passcode that was used before reactivation of the electronic whiteboard 2.

Thereafter, a participating device can log in to the reactivated electronic whiteboard 2 using the passcode that was communicated to the user of the participating device before reactivation of the electronic whiteboard 2. In this way, when the electronic whiteboard 2 corresponding to a host device erroneously turns off the power button 119 or the remote power button 11a while the host device is communicating with a participating device, the host device can reuse the passcode that was used before the erroneous power-off operation to thereby reduce the burden associated with communicating a new passcode and having the user of the participating device reenter the new passcode to reestablish communication, for example.

Note that the present example embodiment may be modified as necessary and implemented in combination with other embodiments, for example.

Sixth Example Embodiment

The electronic whiteboard 2 according to a sixth example embodiment as described below is configured to cooperate with a conference room reservation system to determine whether to restore saved data.

Figure 19:
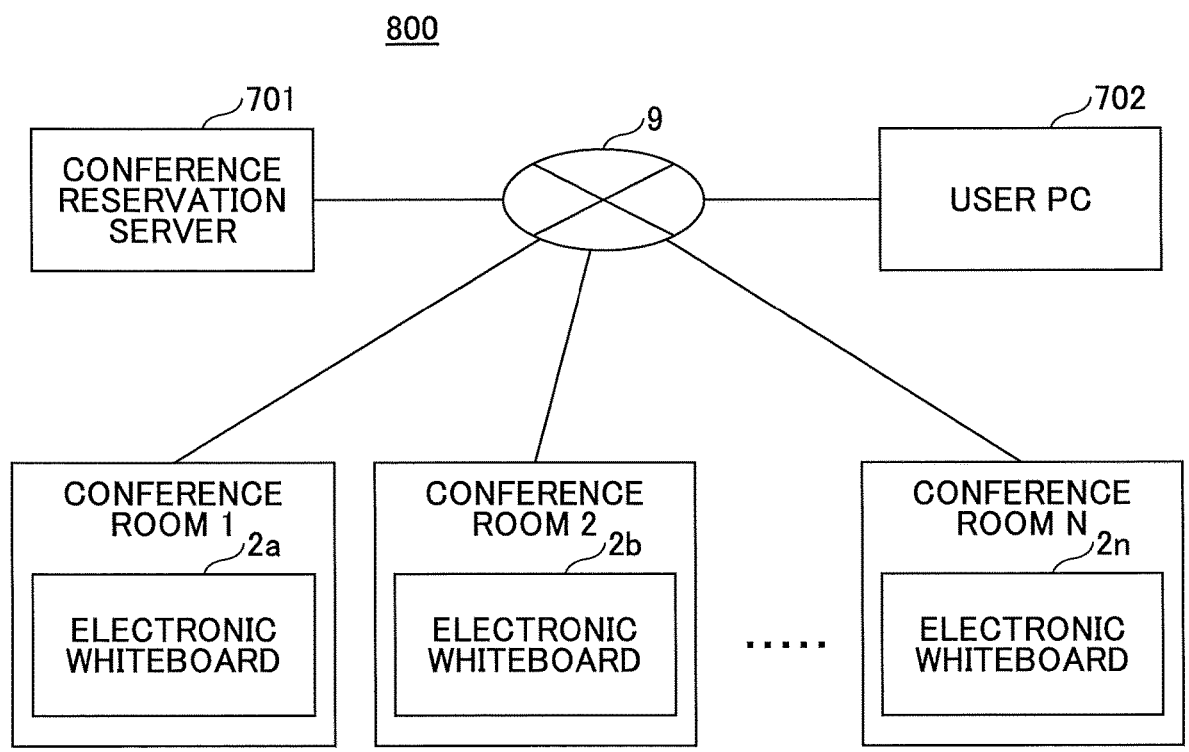
FIG. 19 is a diagram illustrating an example schematic configuration of a conference room reservation system.

FIG. 19 illustrates a schematic configuration of a conference room reservation system 800. The conference room reservation system 800 includes a conference reservation server 701, a user PC 702, and one or more electronic whiteboards 2a-2n that are communicably connected to each other via the communication network 9. The conference reservation server 701 is an information processing apparatus that functions as a web server for accepting a reservation for a conference room from the user PC 702. The user PC 702 is an information processing apparatus, such as the notebook PC 6, and communicates with the conference reservation server 701. The user PC 702 receives HTML data using a communication protocol such as HTTP, displays a web page using browser software, and executes web applications, for example. The user of the user PC 702 sets up information necessary for reserving a conference room via the browser software. Note that reservation of a conference room using such a reservation system is well known, and as such details thereof will be omitted.

The electronic whiteboards 2a-2n are arranged in the conference rooms 1-N. Note that although one electronic whiteboard 2 is arranged in one conference room in FIG. 19, one or more electronic whiteboards 2 may be arranged in one conference room. The conference reservation server 701 manages the corresponding relationship between the conference rooms and the electronic whiteboards 2. When a user reserves a conference room using the user PC 702, reservation information as illustrated in Table 11 below may be registered in the conference reservation server 701, for example.

TABLE 11

| RESERVATION NO. | CONFERENCE ROOM NO. | DATE | START TIME | END TIME | RESERVATION HOLDER |
|---|---|---|---|---|---|
| 1 | CONFERENCE ROOM 1 (ELECTRONIC WHITEBOARD 2a) | 2015 Sep. 30 | 10:00 | 12:00 | USER A |
| 2 | CONFERENCE ROOM 1 (ELECTRONIC WHITEBOARD 2a) | 2015 Sep. 30 | 13:00 | 15:00 | USER F |
| 3 | CONFERENCE ROOM 2 (ELECTRONIC WHITEBOARD 2b) | 2015 Sep. 30 | 11:00 | 12:00 | USER G |
| 4 | CONFERENCE ROOM 3 (ELECTRONIC WHITEBOARD 2c) | 2015 Sep. 30 | 10:00 | 11:00 | USER H |
| ... | ... | ... | ... | ... | ... |

Table 11 schematically illustrates the reservation information managed by the conference reservation server 701. The reservation information includes a reservation number, a conference room number, date, start time, end time, and reservation holder registered in association with each other. For example, it can be appreciated from the above reservation information that the electronic whiteboard 2a is arranged in conference room 1 and that conference room 1 has been reserved by user A from 10:00 to 12:00 on 2015 Sep. 30. Note that a time period from the start time to the end time of a conference reservation may be referred to as "reservation time period".

The electronic whiteboard 2a acquires at least the reservation information of the conference room in which it is located from the conference reservation server 701 and stores the acquired reservation information in the setting file storage unit 430, for example. In this way, the electronic whiteboard 2a can detect the start time and the end time of each conference.

The electronic whiteboard 2 according to the present example embodiment uses the start time and the end time of a conference included in the reservation information to determine whether to restore saved data. That is, because a user would be participating in the same conference from the start time to the end time of the conference, when the power button 119 or the remote power button 11a is turned on between the start time and the end time, the preceding power-off operation of the power button 119 or the remote power button 11a would most likely be an erroneous operation. Also, because a user would be participating in the same conference from the start time to the end time of the conference, the user of the electronic whiteboard would presumably be authorized to view the display information. Also, oftentimes, a participant of a next conference would not enter the conference room until the start time of the next conference. Thus, if a power-off time and a power-on time of the electronic whiteboard 2 are both included between the start time and the end time of a given conference, the electronic whiteboard 2 may determine that there is saved data to be displayed. In this way, loss of display information may be prevented in a case where the power button 119 or the remote power button 11*a* is turned off by an erroneous operation. Also, loss of display information may be prevented in a case where the power button 119 or the remote power button 11*a* is turned off and turned on by the same person. Further, once a next conference is started, saved data from the previous conference would not be restored so that information leakage may be prevented.

Note that in the present example embodiment, the display information restoration setting field 612 of the setting screen as illustrated in FIG. 15 may display a message indicating "Cooperation With Reservation System" and a corresponding checkbox, for example. When the checkbox is checked (set on) by the user, the electronic whiteboard 2 uses the reservation information of the conference reservation server 701 to determine whether to restore saved data.

Figure 20:
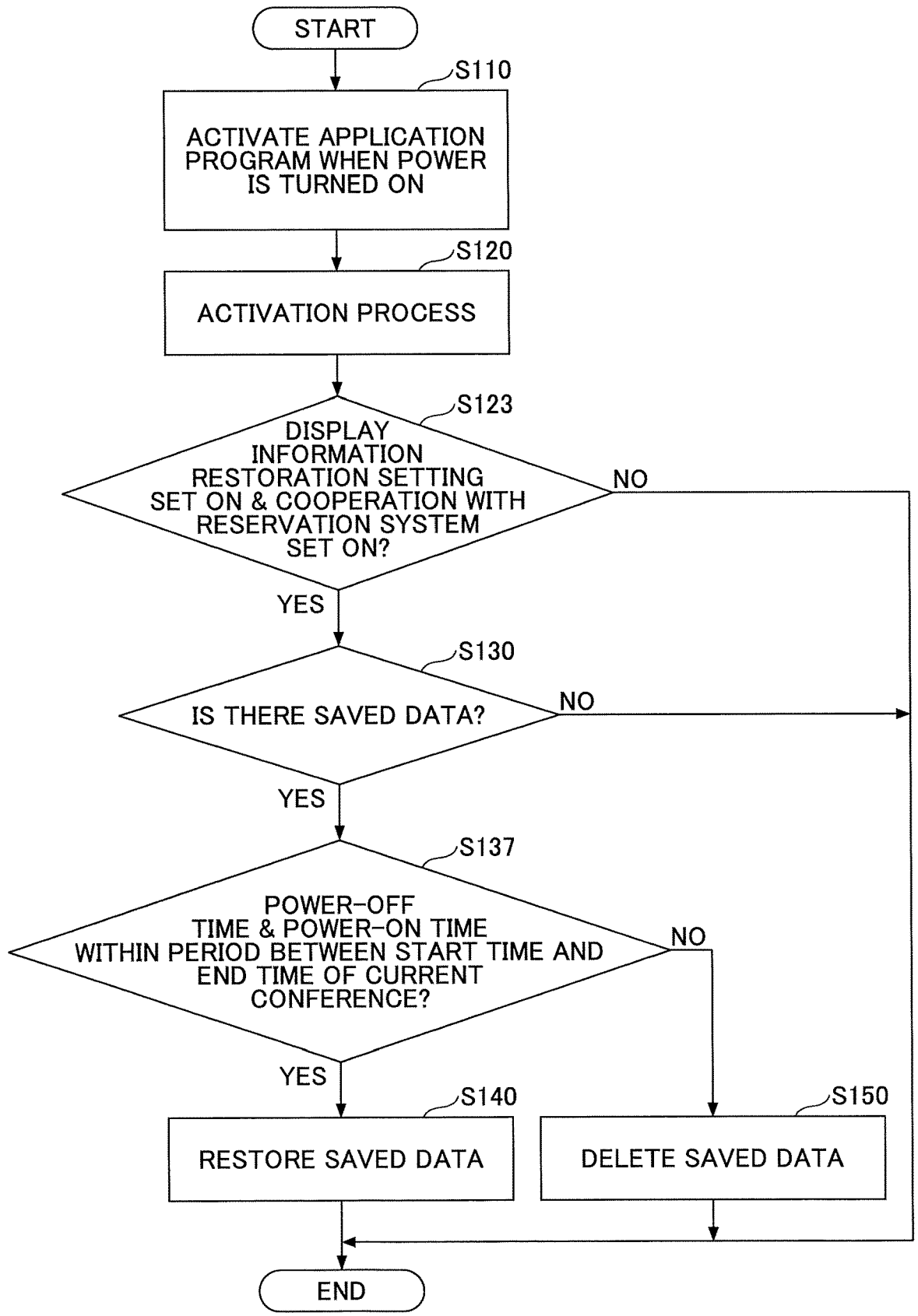

FIG. 20 is a flowchart illustrating an example process performed by the electronic whiteboard 2 when the power button 119 or the remote power button 11*a* of the electronic whiteboard 2 is turned on. Note that process operations that are performed when the power is turned off may be substantially identical to those of FIG. 17A, and in the following, process operations of FIG. 20 that differ from those of FIG. 17B will be mainly described. Note that the present example embodiment relates to a case where the restoration timeout time is not set up.

In step S123 of FIG. 20, the restoration determination unit 415 of the recovery process unit 41 determines whether the display information restoration setting is set on and whether cooperation with the reservation system is set on.

If a positive determination (YES) is made in step S123, the restoration determination unit 415 determines whether there is saved data in step S130.

If a positive determination (YES) is made in step S130, the restoration determination unit 415 determines whether the power-off time and the power-on time are included between the start time and the end time of a current conference (step S137). That is, the restoration determination unit 415 refers to the operation history of the power button 119 or the remote power button 11*a*.

If a positive determination (YES) is made in step S137, the data restoration process unit 414 restores the saved data (step S140). If a negative determination (NO) is made in step S137, the data restoration process unit 414 deletes the saved data (step S150).

The electronic whiteboard 2 according to the present example embodiment refers to the reservation information of the conference room reservation system 800 and the operation history of the power button 119 or the remote power button 11*a*. In this way, electronic whiteboard 2 can estimate whether the last power-off operation of the power button 119 or the remote power button 11*a* was an erroneous operation or whether a power-off operation and a power-on operation of the power button 119 or the remote power button 11*a* were performed by the same person. As a result, loss of display information can be prevented and information leakage can be prevented.

Note that the present example embodiment can be modified as necessary and implemented in combination with other embodiments, for example.

Other Application Examples

Although the certain example embodiments for implementing the present invention have been described above, the present invention is not limited to these example embodiments, and various modifications, substitutions, and changes may be made without departing from the scope of the present invention.

For example, although the above-described embodiments relate to saving display information of the electronic whiteboard 2, the present invention can also be implemented with respect to an image projected by a projector, information displayed by a teleconference terminal, and the like. Further, the present invention can be applied to a wide variety of general-purpose information processing apparatuses, such as tablet terminals, smart phones, PDAs (Personal Digital Assistants), PCs, digital signage, game machines, and the like.

Also, the electronic whiteboard 2 may also be referred to as "electronic information board" or "interactive whiteboard", for example.

Also, in addition to providing the backup data storage unit 420 and the page data storage unit 300 in the electronic whiteboard 2, the backup data and page data may be stored in a server or a NAS (Network Attached Storage) of the communication network 9, for example.

Also, in the example functional configurations of the electronic whiteboard 2 illustrated in FIGS. 4-6 and 8, process functions are divided up according to main functions in order to facilitate understanding of the process operations of the electronic whiteboard 2. The present invention is not limited by the above manner of division and the names of the process units illustrated in these examples. Processes of the electronic whiteboard 2 can also be divided into more process units according to the process contents. Also, one process unit may be subdivided to include further processes, for example.

Note that the image process unit 30 and the video superimposition unit 28 are example embodiments of circuitry implementing a process of controlling a display device to display visible information, the power button monitoring unit 52 is an example embodiment of the circuitry implementing a process of detecting an operation of a power button being turned off, and the time acquisition unit 416 is an example embodiment of the circuitry implementing a process of recording a power-on time and a power-off. The data saving process unit 413 is an example embodiment of the circuitry implementing a process of storing visible information displayed by the display device in a first storage device, the storage determination unit 412 is an example embodiment of the circuitry implementing a process of determining whether to display the visible information stored in the first storage device, and the data restoration process unit 414 is an example embodiment of the circuitry implementing a process of controlling the display device to display the visible information stored in the first storage device upon determining to display the visible information. The page data storage unit 300 is an example embodiment of the first storage device and the setting file storage unit 430 is an example embodiment of a second storage device. The display 3 is an example embodiment of the display device.

The operation process unit 26 is an example embodiment of the circuitry implementing a process of accepting a setting specifying whether to store visible information displayed on the display device, and the passcode management unit 810 is an example of a storage area holding a passcode. The conference reservation server 701 is an example of an external device. Also the process operations performed by the electronic whiteboard 2 according to the above-described first through sixth example embodiments are examples of an information processing method according to the present invention.

Although the present invention has been described above with respect to certain example embodiments, the present invention is not limited to the above-described embodiments, and numerous additional modifications and variations are possible in light of the above teachings. It is therefore to be understood that, within the scope of the appended claims, the teachings within the present application may be practiced in a manner other than as specifically described herein.

As can be appreciated by those skilled in the computer arts, the present invention may be implemented as convenient using a conventional general-purpose digital computer programmed according to the teachings of the present application, for example. Appropriate software coding can readily be prepared by skilled programmers based on the teachings of the present application, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by processing circuitry including one or more processing circuits. A processing circuit includes a programmed processor. A processing circuit also includes a device, such as an application specific integrated circuit (ASIC), and conventional circuit components arranged to perform the functions. The processing circuitry is implemented as at least a portion of a microprocessor. The processing circuitry may be implemented using one or more circuits, microprocessors, microcontrollers, application specific integrated circuits, dedicated hardware, digital signal processors, microcomputers, central processing units, field programmable gate arrays, programmable logic devices, state machines, super computers, or any combination thereof. Also, the processing circuitry may include one or more software modules executable within one or more processing circuits. The processing circuitry may further include memory configured to store instructions and/or code that causes the processing circuitry to execute the functions.

If embodied in software, each functional unit or block may represent a module, a segment, or a portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each functional unit or block may represent a circuit or a number of interconnected circuits to implement the specified logical function(s).

What is claimed is:

1. An electronic whiteboard configured to display an image drawn on a display with an electronic pen or a user finger, configured to be activated in response to a power button being turned on and configured to stop operating in response to the power button being turned off, the electronic whiteboard comprising:
a display device configured to display image;
a first storage device configured to store the image displayed on the display device; and
circuitry configured to implement processes of
controlling the display device to display the image;
detecting both an operation of the power button being turned on, and an operation of the power button being turned off;
recording a power-on time at which the power button is turned on and a power-off time at which the power button is turned off;
automatically storing at least a part of the image that was displayed on the display device from a first power-on time until the power-off time in the first storage device upon detecting the power button being turned off, the first power-on time corresponding to an immediately preceding power-on time recorded before the power-off time;
determining whether to display the stored image on the display device based on a second power-on time and the power-off time, the second power-on time corresponding to an immediately subsequent power-on time recorded after the power-off time, wherein
the circuitry controls the display device to display the image stored in the first storage device upon determining to display the image on the display device.

2. The electronic whiteboard according to claim 1, wherein the circuitry further implements processes of
estimating whether the power button was turned off by an erroneous operation based on the second power-on time and the power-off time, wherein it is determined that the power button was turned off by the erroneous operation in a case where a difference between the second power-on time and the power-off time is below a predetermined threshold value; and
controlling the display device to display the image stored in the first storage device upon estimating that the power button was turned off by an erroneous operation.

3. The electronic whiteboard according to claim 1, wherein the circuitry further implements processes of
estimating whether the power button was turned off and the power button was turned on by the same person based on the second power-on time and the power-off time, wherein it is determined that the power button was turned off and the power button was turned on by the same person in a case where a difference between the second power-on time and a power-off time is below a predetermined threshold value; and
controlling the display device to display the image stored in the first storage device upon estimating that the power button was turned off and the power button was turned on by the same person.

4. The electronic whiteboard according to claim 1, further comprising:
a second storage device configured to store a reservation time period for the electronic whiteboard, wherein the circuitry determines to display the image on the display device upon determining that the first time and the power-off time are included within the reservation time period.

5. The electronic whiteboard according to claim 1, wherein the circuitry further implements processes of
accepting a setting specifying whether to store the image displayed on the display device, wherein at least a part of the visible information displayed on the display device is stored in the first storage unit upon accepting the setting specifying that the image is to be stored and detecting the operation of the power button being turned off.

6. The electronic whiteboard according to claim 5, wherein the circuitry controls the display device to display the image stored in the first storage device depending on determination results of whether the setting specifying that the image is to be stored has been accepted and whether to display the image on the display device.

7. The electronic whiteboard according to claim 1, wherein the circuitry deletes the image stored in the first storage device upon determining not to display the image on the display device.

8. A non-transitory computer-readable medium storing a program to be executed by a computer that controls a process performed by an electronic whiteboard configured to display an image drawn on a display with an electronic pen or a user finger, configured to be activated in response to a power button being turned on and configured to stop operating in response to the power button being turned off, the program when executed causing the computer to implement an information processing method comprising:

controlling a display device to display an image;

detecting both an operation of the power button being turned on, and an operation of the power button being turned off;

recording a power-on time at which the power button is turned on and a power-off time at which the power button is turned off;

automatically storing at least a part of the image that was displayed on the display device from a first power-on time until the power-off time in a first storage device upon detecting the power button being turned off, the first power-on time corresponding to an immediately preceding power-on time recorded before the power-off time;

determining whether to display the stored image on the display device based on a second power-on time and the power-off time, the second power-on time corresponding to a next consecutive power-on time recorded after the power-off time, wherein the image stored in the first storage device is displayed on the display device upon determining to display the image on the display device.

9. An information processing method performed by an electronic whiteboard that is activated in response to a power button being turned on and stops operating in response to the power button being turned off, the information processing method comprising:

controlling a display device to display an image;

detecting an operation of the power button being turned off;

recording a power-on time at which the power button is turned on and a power-off time at which the power button is turned off;

storing at least a part of the image that was displayed on the display device from a first power-on time until the power-off time in a first storage device upon detecting the power button being turned off, the first power-on time corresponding to an immediately preceding power-on time recorded before the power-off time;

determining whether to display the stored image on the display device based on a second power-on time and the power-off time, the second power-on time corresponding to the next power-on time recorded after the power-off time, wherein the image stored in the first storage device is displayed on the display device upon determining to display the image on the display device.

* * * * *